United States Patent
Atlas et al.

(10) Patent No.: US 11,423,086 B2
(45) Date of Patent: *Aug. 23, 2022

(54) DATA PROCESSING SYSTEM AND METHOD OF ASSOCIATING INTERNET DEVICES BASED UPON DEVICE USAGE

(71) Applicant: THE TRADE DESK, INC., Ventura, CA (US)

(72) Inventors: Jason Atlas, Seattle, WA (US); Fady Kalo, London (GB); Jiefei Ma, London (GB)

(73) Assignee: The Trade Desk, Inc., Ventura, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/908,574

(22) Filed: Jun. 22, 2020

(65) Prior Publication Data

US 2020/0320126 A1    Oct. 8, 2020

Related U.S. Application Data

(63) Continuation of application No. 15/412,245, filed on Jan. 23, 2017, now Pat. No. 10,691,751.

(51) Int. Cl.
*G06F 16/901* (2019.01)
*H04L 67/50* (2022.01)
*G06F 16/28* (2019.01)
*G06F 16/2455* (2019.01)

(52) U.S. Cl.
CPC .... *G06F 16/9024* (2019.01); *G06F 16/24568* (2019.01); *G06F 16/285* (2019.01); *H04L 67/22* (2013.01)

(58) Field of Classification Search
CPC .......... G06F 16/9024; G06F 16/24568; G06F 16/285; H04L 67/22
See application file for complete search history.

(56) References Cited

U.S. PATENT DOCUMENTS

| | | |
|---|---|---|
| 9,514,248 B1 | 12/2016 | Guan et al. |
| 2008/0256619 A1 | 10/2008 | Neystadt et al. |
| 2009/0173783 A1 | 7/2009 | Fomitchev |
| 2014/0095320 A1 | 4/2014 | Sivaramakrishnan et al. |
| 2014/0122697 A1 | 5/2014 | Liu et al. |
| 2015/0206029 A1* | 7/2015 | Chikano .............. G06K 9/6211 382/201 |
| 2016/0182657 A1 | 6/2016 | Mukherjee et al. |
| 2016/0323239 A1 | 11/2016 | Cheng et al. |

OTHER PUBLICATIONS

International Search Report dated May 28, 2018 of International application No. PCT/US2018/014807.
Written Opinion dated May 28, 2018 of International application No. PCT/US2018/014807.
Examination Report dated Jul. 5, 2017 of Great Britain application No. GB1701126.3.

* cited by examiner

*Primary Examiner* — Ashish Thomas
*Assistant Examiner* — Dustin D Eyers
(74) *Attorney, Agent, or Firm* — Baker & McKenzie, LLP

(57) ABSTRACT

A data processing system performs data processing of raw or preprocessed data. The data includes log files, bitstream data, and other network traffic containing either cookie or device identifiers. In some embodiments, the data processing system includes a connectivity overlay engine comprising a data ingester, a connectivity generator, an event access control system, and a feature vector generation framework.

20 Claims, 26 Drawing Sheets

| FEATURE NAME | DESCRIPTION |
| --- | --- |
| L | ("LABEL") CAN WEE VERIFY THAT CD BELONG TO UNIQUE USER? OR THAT THEY DO NOT? |
| NT | WHAT TYPE OF DEVICE ID IS D? (IDFA, RAW, ANDROID, APPLE, ...) |
| OI | HOW MANY TOTAL OBSERVATIONS DO WE HAVE FOR D? |
| OJ | HOW MANY TOTAL OBSERVATIONS DO WE HAVE FOR C? |
| CO | HOW MANY UNIQUE IPs WHERE ONLY C OR D OCCUR? (IP SET SYMMETRIC DIFFERENCE) |
| GEN | DO CD HAVE THE SAME GENDER? OPPOSITE GENDER? NO GENDER INFO? |
| AGE | DO CD HAVE THE SAME AGE? HOW DIFFERENT ARE THEIR AGES? |
| GEO | DO CD HAVE THE SAME HOME LOCATION? HOW CLOSELY MATCHED OR BADLY MISMATCHED ARE THEIR INFERRED HOME LOCATIONS |

FIG. 7

Overview of device connectivity overlay engine

Overview of data ingestion $U1_B$ (C1, D1, C2)

DATA PROCESSING SYSTEM AND METHOD OF ASSOCIATING INTERNET DEVICES BASED UPON DEVICE USAGE

CROSS-REFERENCE TO OTHER APPLICATIONS

This application is a continuation of and claims priority to U.S. application Ser. No. 15/412,245 filed on Jan. 23, 2017, the disclosure of which is incorporated by reference herein in its entirety for all purposes.

TECHNICAL FIELD

The present disclosure is concerned with data processing systems for executing data processing for associating Internet devices based upon device usage. Moreover, the present disclosure relates to methods of using aforementioned data processing systems for associating Internet devices based upon device usage. Furthermore, the present disclosure is concerned with a software product recorded on machine-readable data storage media, characterized in that the software product is executable upon computing hardware for executing aforementioned methods.

BACKGROUND

Conventionally, the Internet provides a data communication network through which persons are able to exchange information using a wide variety of different types of devices. For example, a given user owns a smartphone, a mobile tablet, a laptop computer, and a connected TV. As users work, socialize, research, and buy products across a multiple of different Internet-connectable devices, commercial companies are continuing to shift their focus to reaching users more effectively across their respective multiple devices. Although a given person, for example, owns and uses different devices to communicate over the Internet, a relationship among different devices and users of the different devices is not readily apparent to outsiders such as commercial companies seeking to reach the given person across the given persons' multiple devices.

Such an aforementioned relationship potentially involves the given person using different devices with different device identifiers to communicate through the Internet. For example, the given person communicates anonymously through the Internet without disclosing a personal identifier of the given person. User device connections to the Internet are often transitory and dynamic. Devices typically connect to the Internet through a connection point associated with an Internet Protocol (IP) address. However, user devices potentially use different network addresses at different times. During communication through the Internet, user device identifying information is potentially exchanged, such as a device identifier or a user identifier. However, the identifying information used during an Internet communication by a given user using one device is potentially different from the identifying information used during Internet communication by the same user using a different device. In addition, a same given device may use different identifying information during different Internet communications. Thus, a person potentially uses different IP addresses at different times when communicating through the Internet with different devices. For example, a user has multiple different e-mail accounts and potentially participates in use of social media under different pseudonyms. Thus, there are presently no readily available reliable deterministic methods of identifying users using different devices accessing the Internet at present.

SUMMARY

The aspects of the disclosed embodiments seek to provide an improved system for determining different types of associations between devices (for example, intra-device associations, inter-device associations including ownership, associations in share of usages, associations of households, and similar), based upon raw or unprocessed data describing data network activities of the devices, for example Internet browsing activities; such improved systems are based upon, when crossing boundaries of platforms, devices, logins, and so forth, an identity of a given individual being constant, and based upon usage information that is collected pertaining to the given individual, the identity of the given individual can be inferred.

According to a first aspect, there is provided a system comprising:
 (i) a computer readable storage device for storing raw or preprocessed data that associates device identifiers with device activity history;
 (ii) a pairing framework for determining different types of candidate device pairs based at least in part upon at least a portion of the device activity history;
 (iii) a feature vector generation framework for producing multiple feature value feature vectors corresponding to determined candidate device pairs, depending on one or more types of pairs and based at least in part upon device activity history associated within the raw or preprocessed data with devices of the determined candidate device pairs,
 characterized in that:
 (iv) the feature vector generation framework is operable to employ at least one rule to produce a feature value for at least one feature represented within a feature vector corresponding to at least one determined candidate device pair based at least in part upon both device activity history associated within the raw or preprocessed data with a first device identifier of the at least one determined candidate device pair and device activity history associated within the raw or preprocessed data with a second device identifier of the at least one determined candidate device pair;
 (v) a scoring engine is operable to determine scores to associate with determined candidate device pairs, including the at least one determined candidate device pair, based at least in part upon produced feature vectors associated with the determined candidate device pairs;
 (vi) a computer readable storage device is operable to store a graph structure, wherein nodes within the graph structure represent device identifiers, including the first device identifier and the second device identifier of the at least one determined candidate device pair, and wherein edges between pairs of nodes within the graph structure indicate determined candidate device pairs; and
 (vii) a clustering engine is operable to identify respective clusters of two or more nodes within the graph structure that represent respective groups of devices.

The aspects of the disclosed embodiments provide the advantage in that the system is capable of providing for more efficient identification of associations of user devices from raw or unprocessed data (namely, avoiding a need to generate any form of index structure, thereby saving computational effort and/or generating association results more rapidly).

It will be appreciated, in respect of "activity history", that, for example, each Internet communication originates from the device can be captured as an event with transmitted information, and the sequence of such events can be viewed as a history of the device's activity on the Internet.

It will be appreciated in respect of "framework", for example, that there may potentially be different engines for different types of pairs; for example, at least two such engines (for example, for intra-device pairs and inter-device pairs) are described later in the present disclosure.

Optionally, in the system, the raw or unprocessed data includes, for example, log files, bitstream data, and other network traffic containing either cookie or device identifiers.

According to a second aspect of the disclosed embodiments, there is provided a method of using a system for determining associations, wherein the method includes:
(i) using a computer readable storage device to store raw or preprocessed data that associates device identifiers with device activity history;
(ii) using a pairing framework configured to determine candidate device pairs based at least in part upon at least a portion of the device activity history;
(iii) using a feature vector generation framework to produce multiple feature value feature vectors corresponding to determined candidate device pairs, based at least in part upon activity history associated within the raw or preprocessed data with devices of the determined candidate device pairs,
characterized in that the method further includes:
(iv) arranging for the feature vector generation framework to employ at least one rule to produce a feature value for at least one feature represented within a feature vector corresponding to at least one determined candidate device pair based at least in part upon both device activity history associated within the raw or preprocessed data with a first device identifier of the at least one determined candidate device pair and device activity history associated within the raw or preprocessed data with a second device identifier of the at least one determined candidate device pair;
(v) using a scoring engine to determine scores to associate with determined candidate device pairs, including the at least one determined candidate device pair, based at least in part upon produced feature vectors associated with the determined candidate device pairs;
(vi) using a computer readable storage device to store a graph structure, wherein nodes within the graph structure represent device identifiers, including the first device identifier and the second device identifier of the at least one determined candidate device pair, and wherein edges between pairs of nodes within the graph structure indicate determined candidate device pairs; and
(vii) using a clustering engine to identify respective clusters of two or more nodes within the graph structure that represent respective groups of devices.

According to a third aspect, there is provided a computer program products comprising non-transitory computer-readable storage media having computer-readable instructions stored thereon, the computer-readable instructions being executable by a computerized device comprising processing hardware to execute the method of the second aspect.

It will be appreciated that features of the invention are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams wherein.

Figure 2:
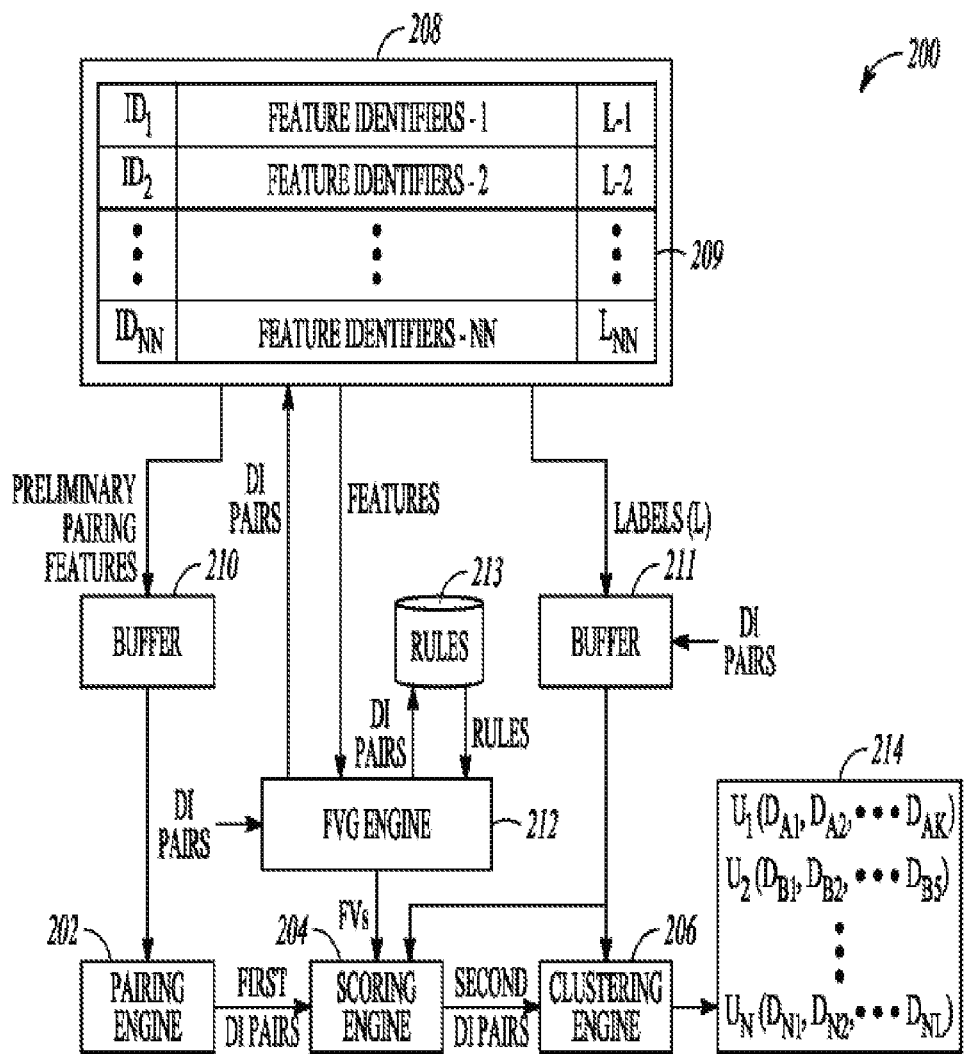
FIG. 2 is a schematic illustration of a data processing system pursuant to embodiments of the present disclosure, wherein the data processing system includes a digital identity pairing engine.
Figure 4A:
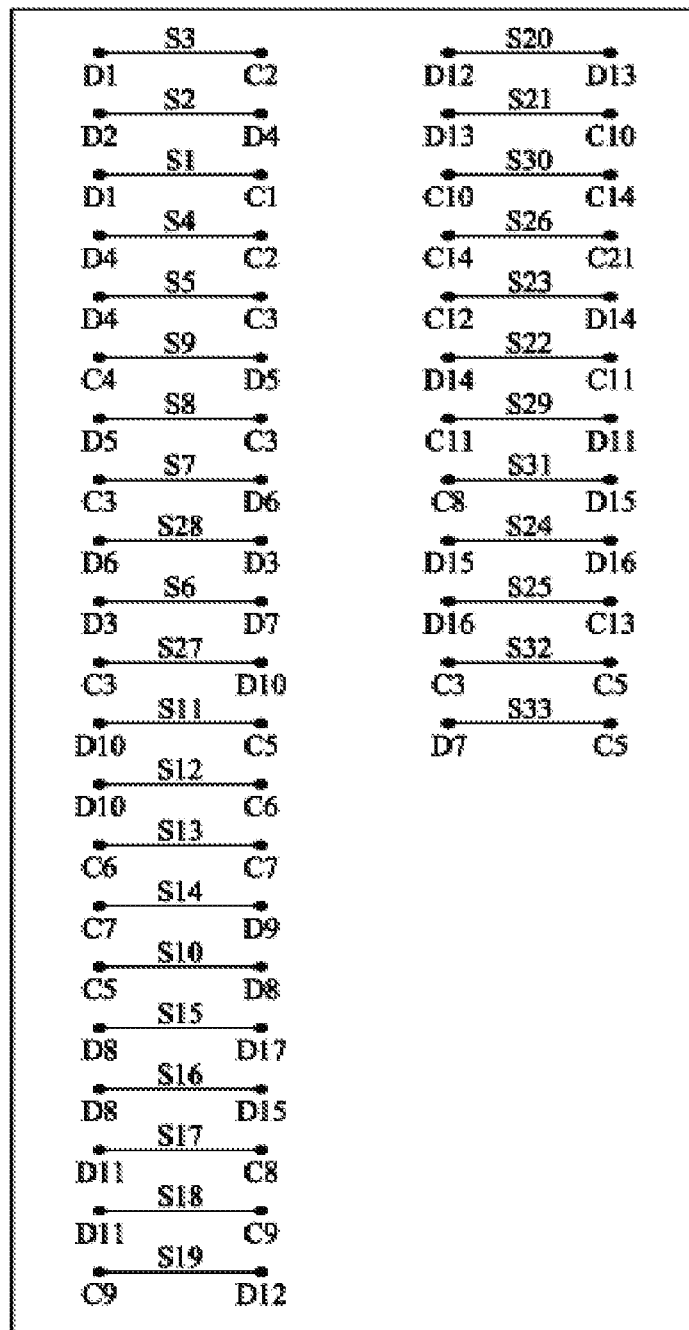
FIG. 4A is an illustration of a plurality of example device pairs identified using the pairing engine of FIG. 2 pursuant to embodiments of the present disclosure.
Figure 4B:
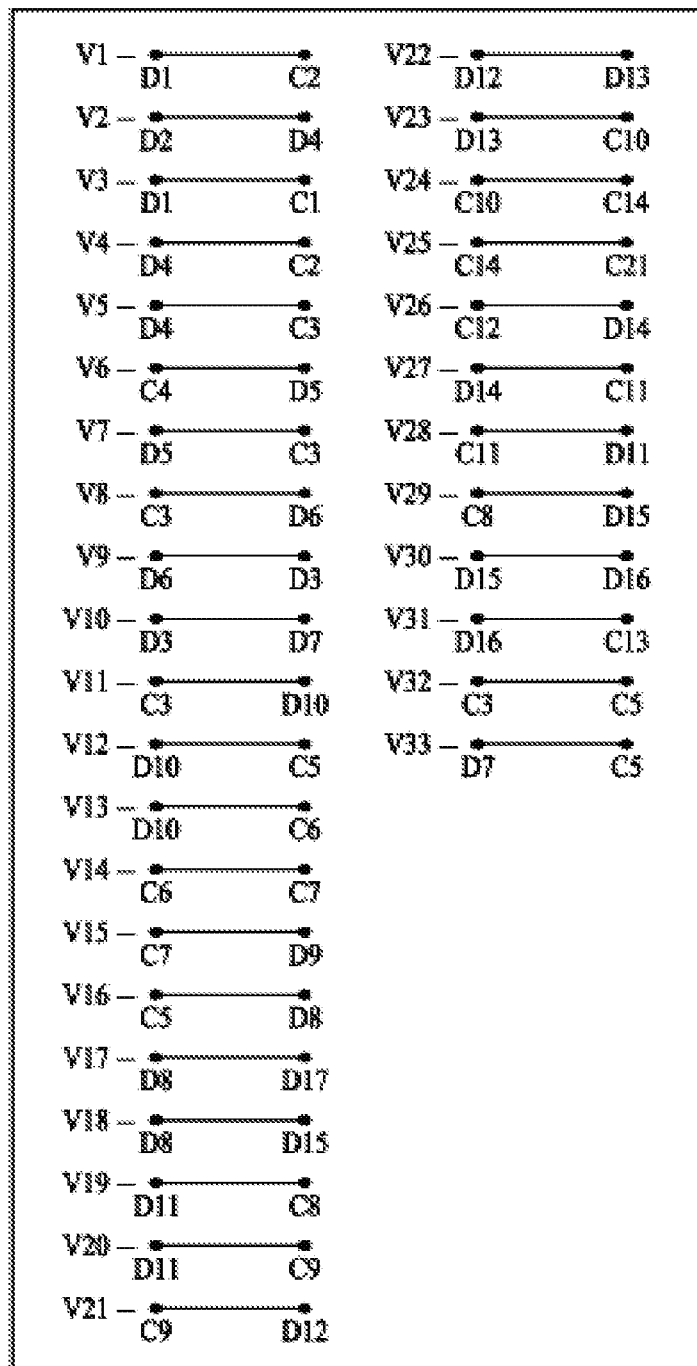
FIG. 4B is an illustration of the example device pairs of FIG. 4A associated with example feature vectors pursuant to embodiments of the present disclosure.
Figure 5:
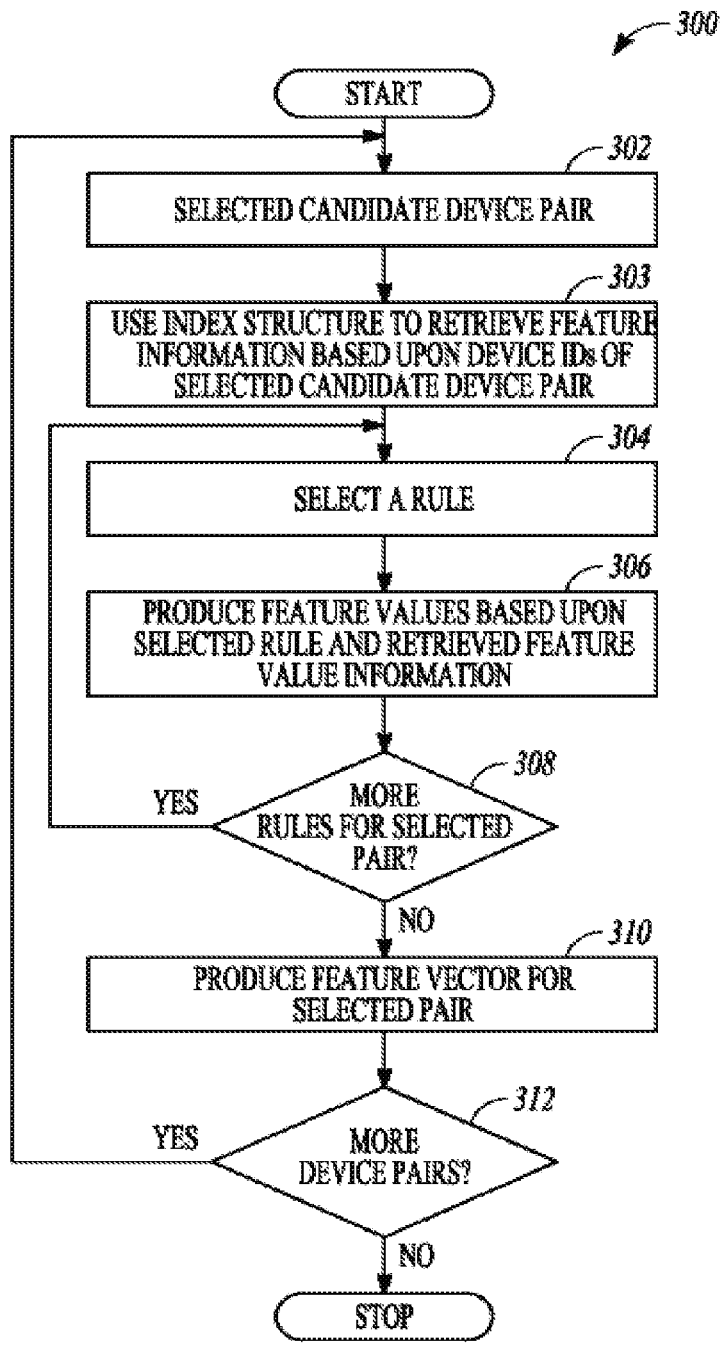
FIG. 5 is an illustrative process flow diagram representing a configuration of a feature vector generation engine of the system of FIG. 2 pursuant to embodiments of the present disclosure.
Figure 6A:
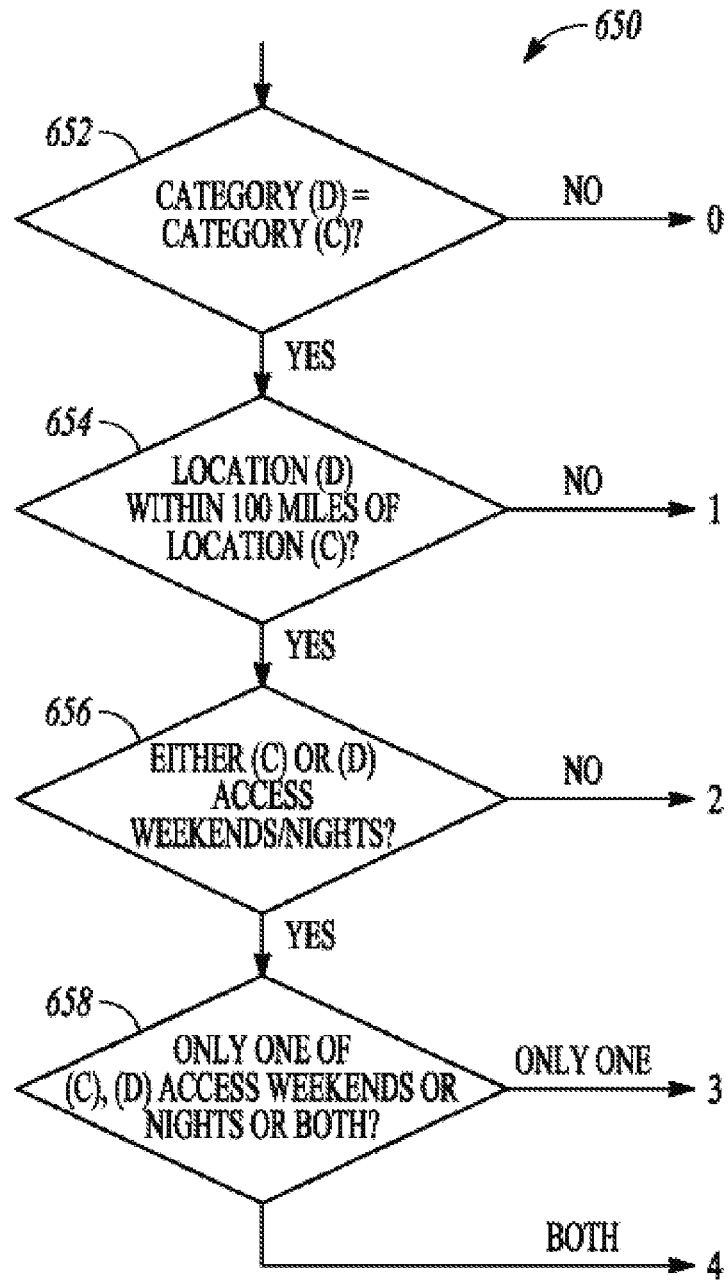
Figure 6B:
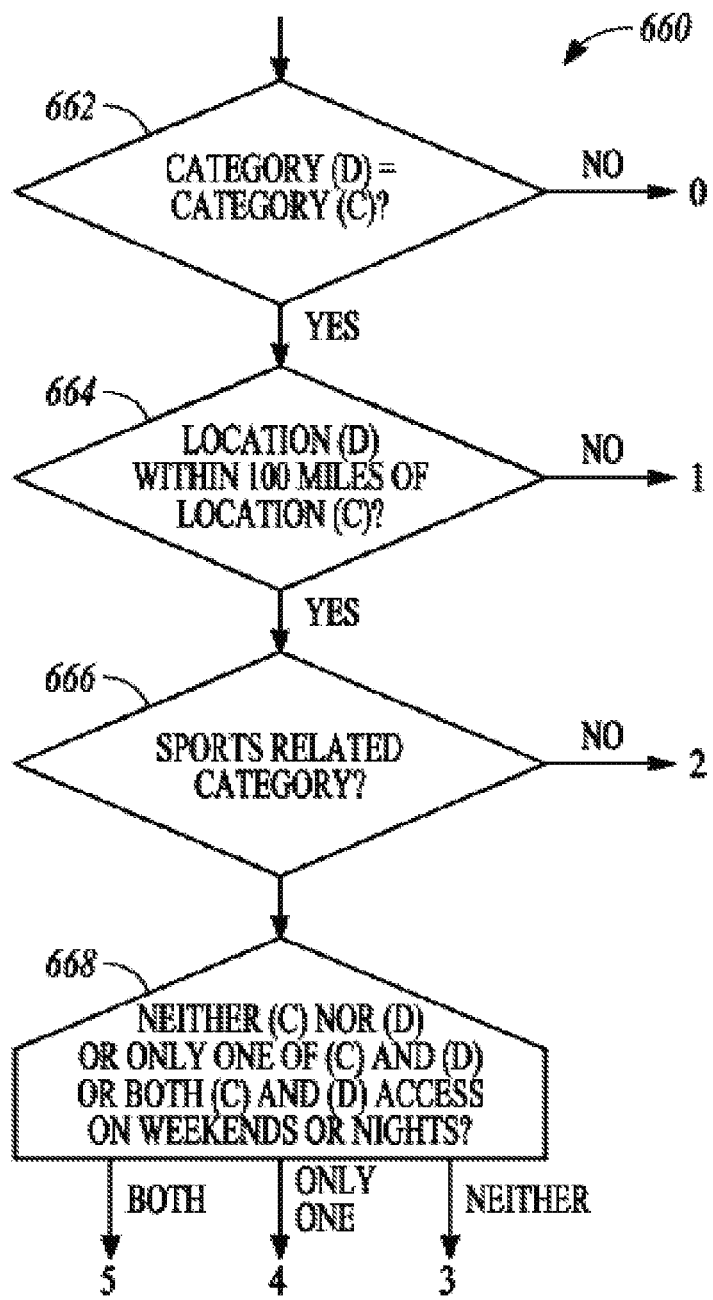
Figure 8A:
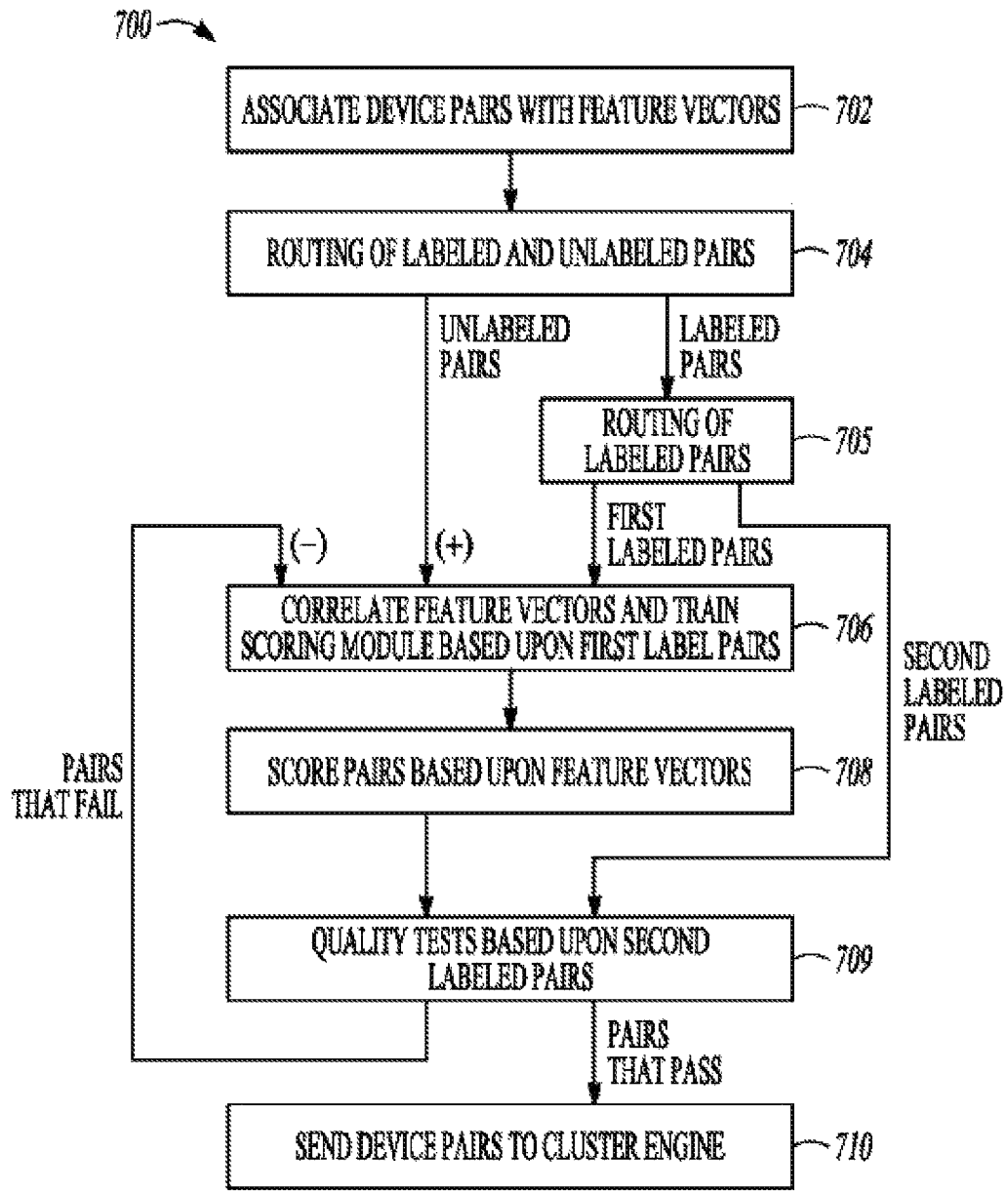
Figure 8B:
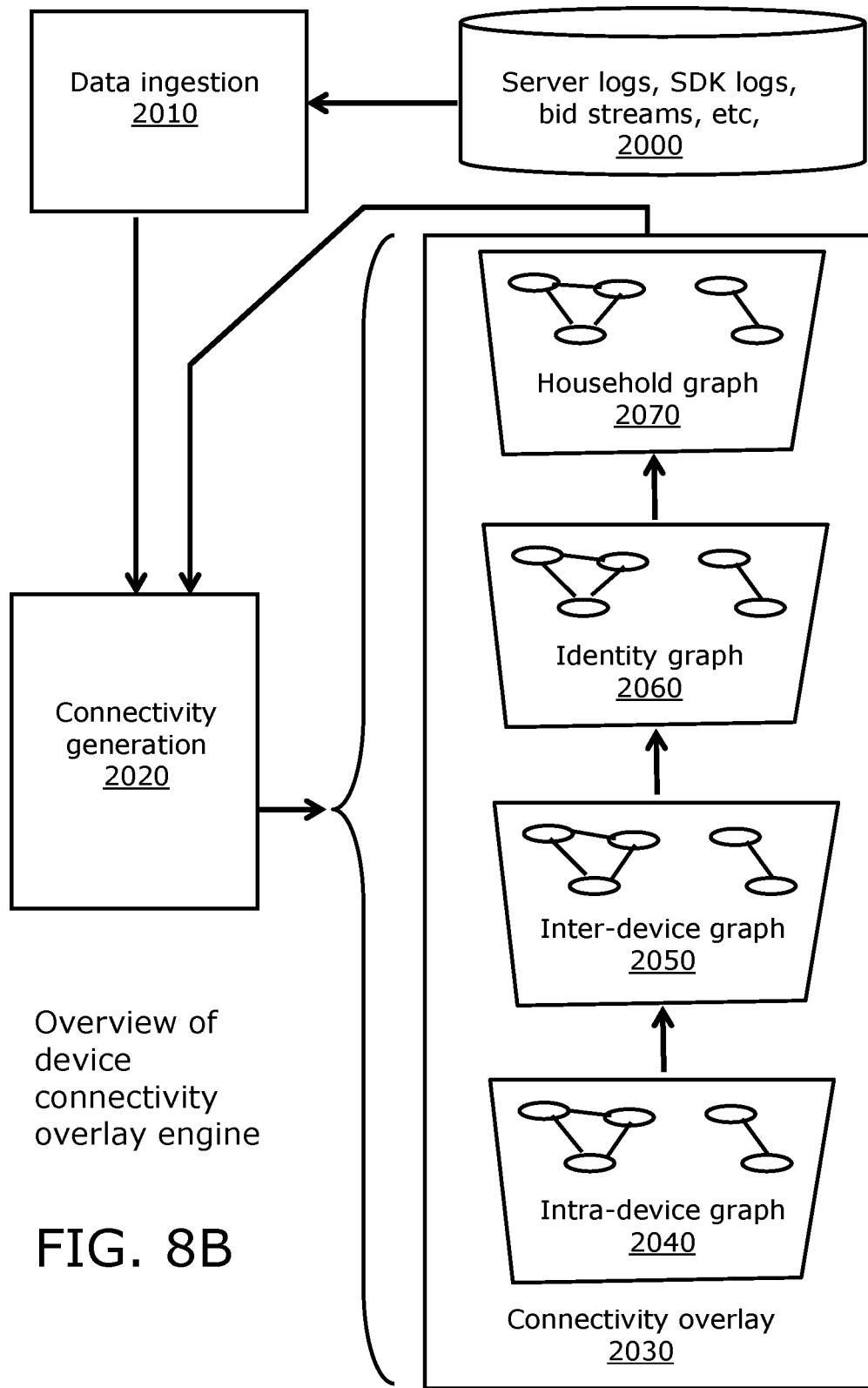
Figure 8C:
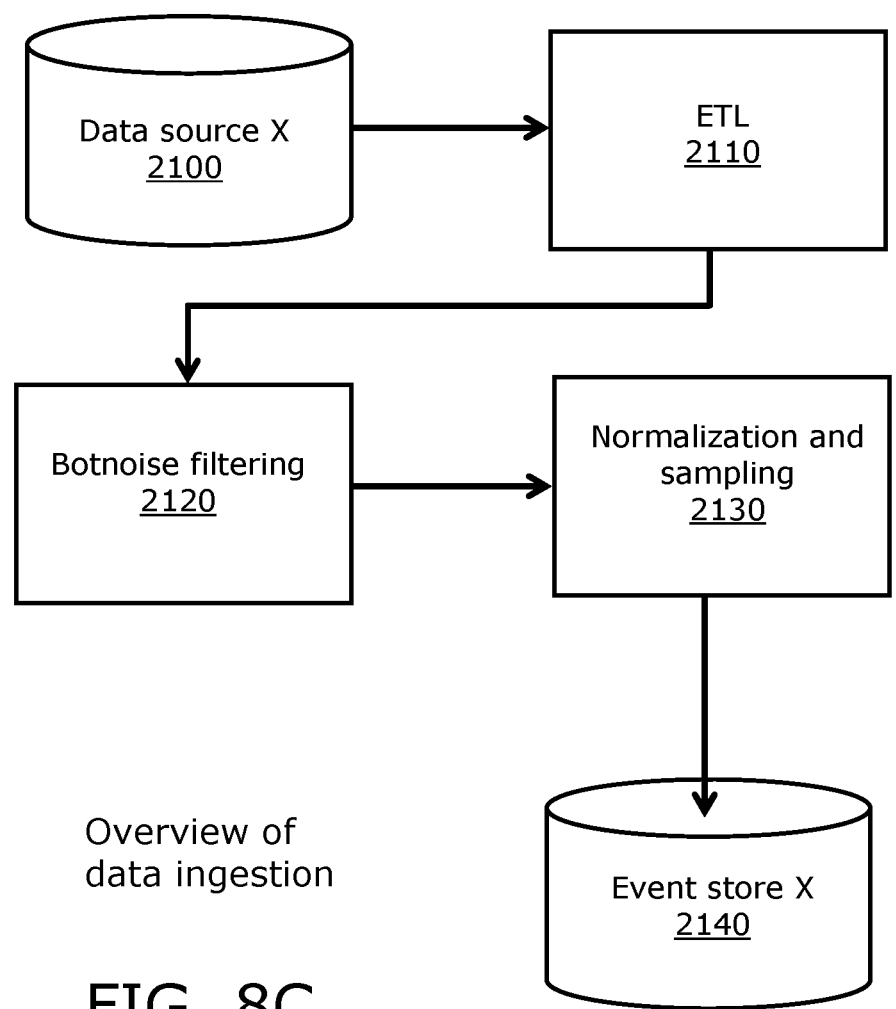
Figure 8D:
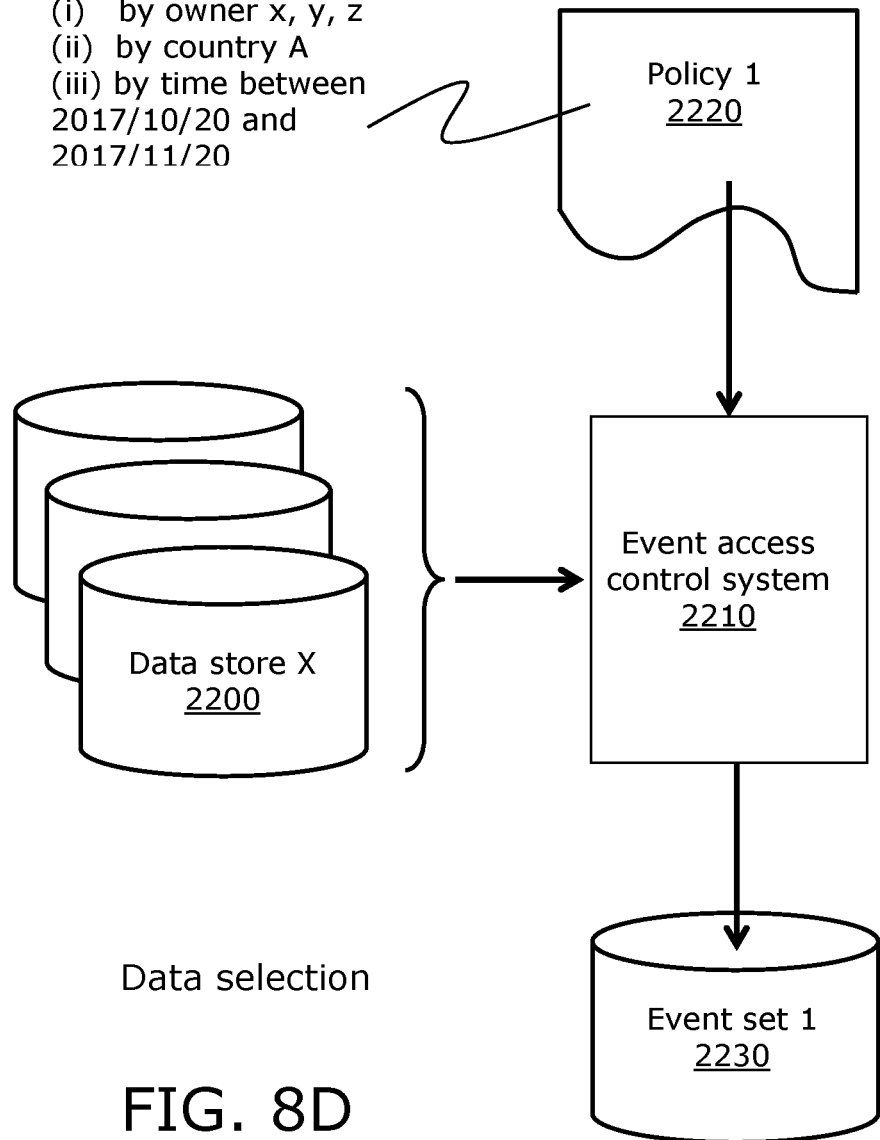
Figure 8E:
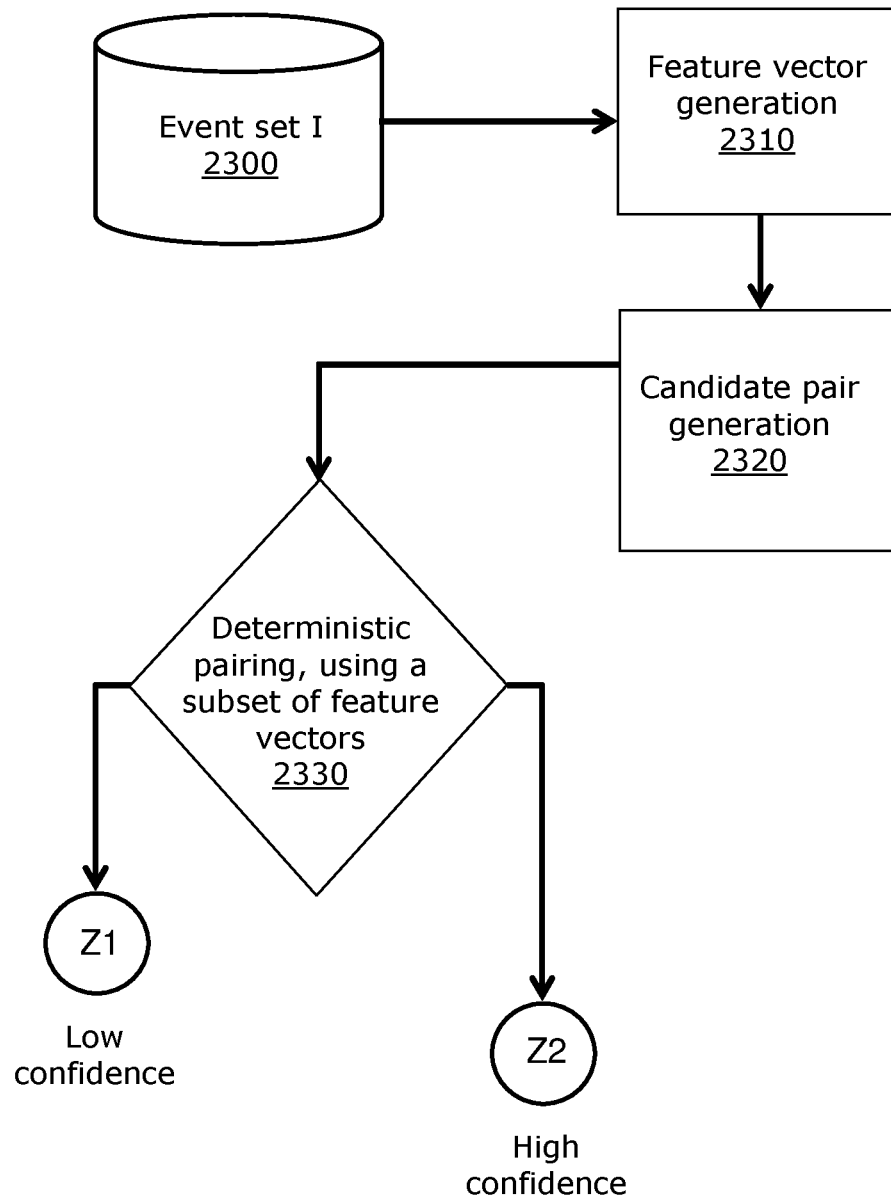
Figure 8E:
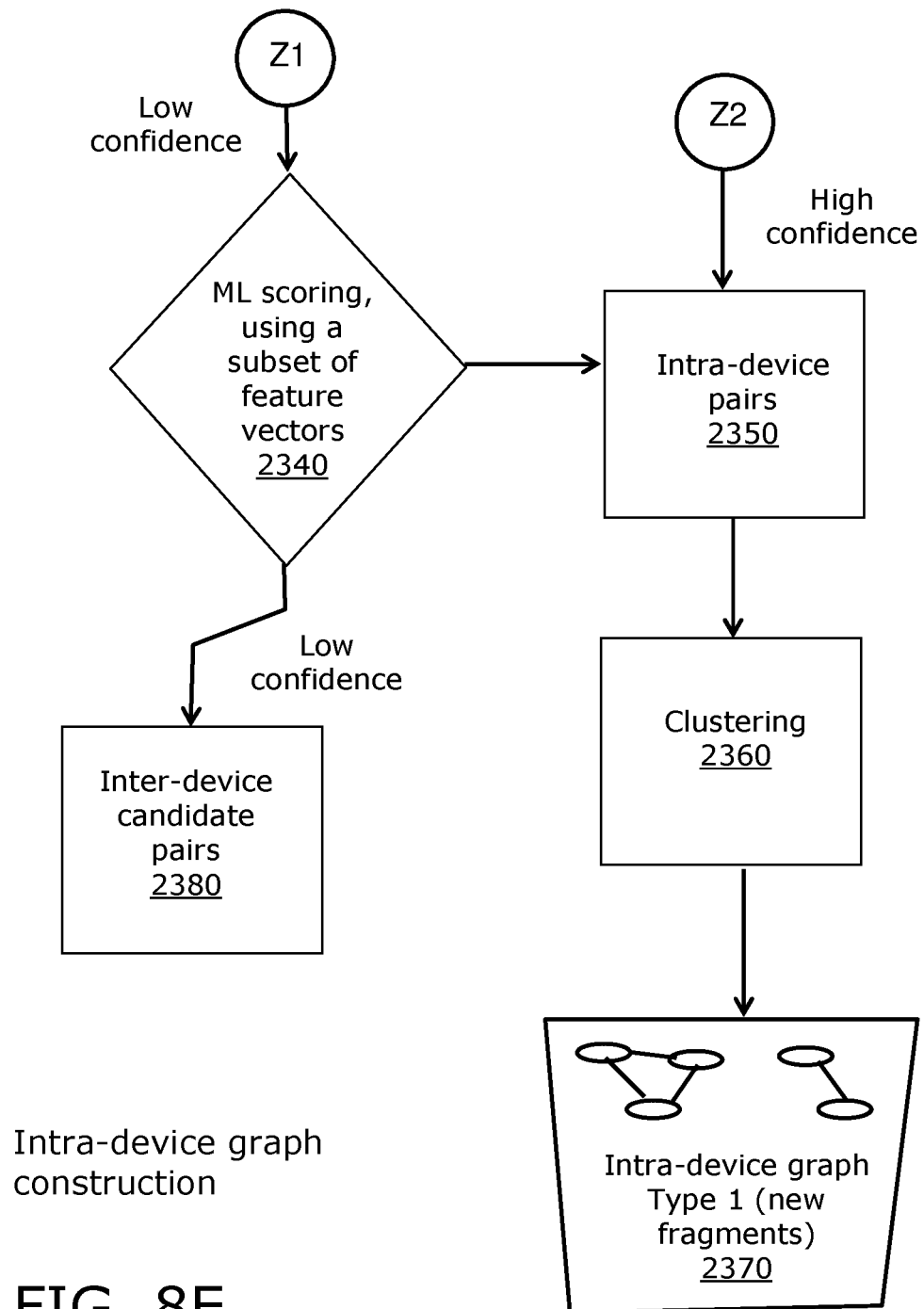
Figure 9:
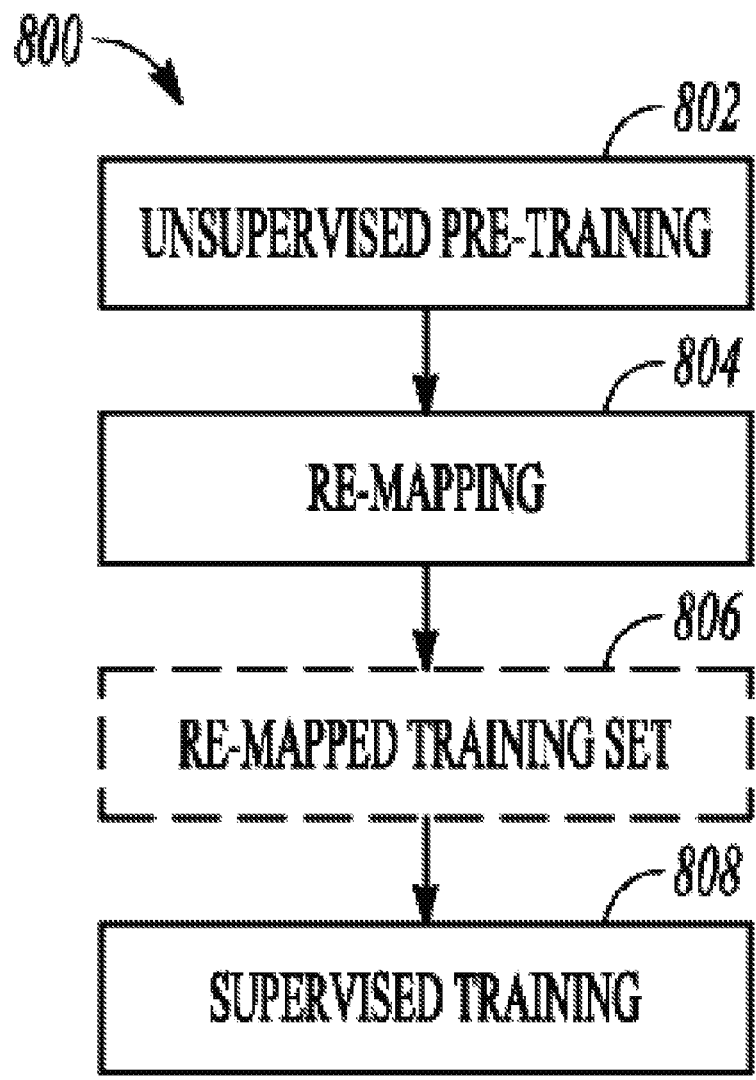
Figure 10A:
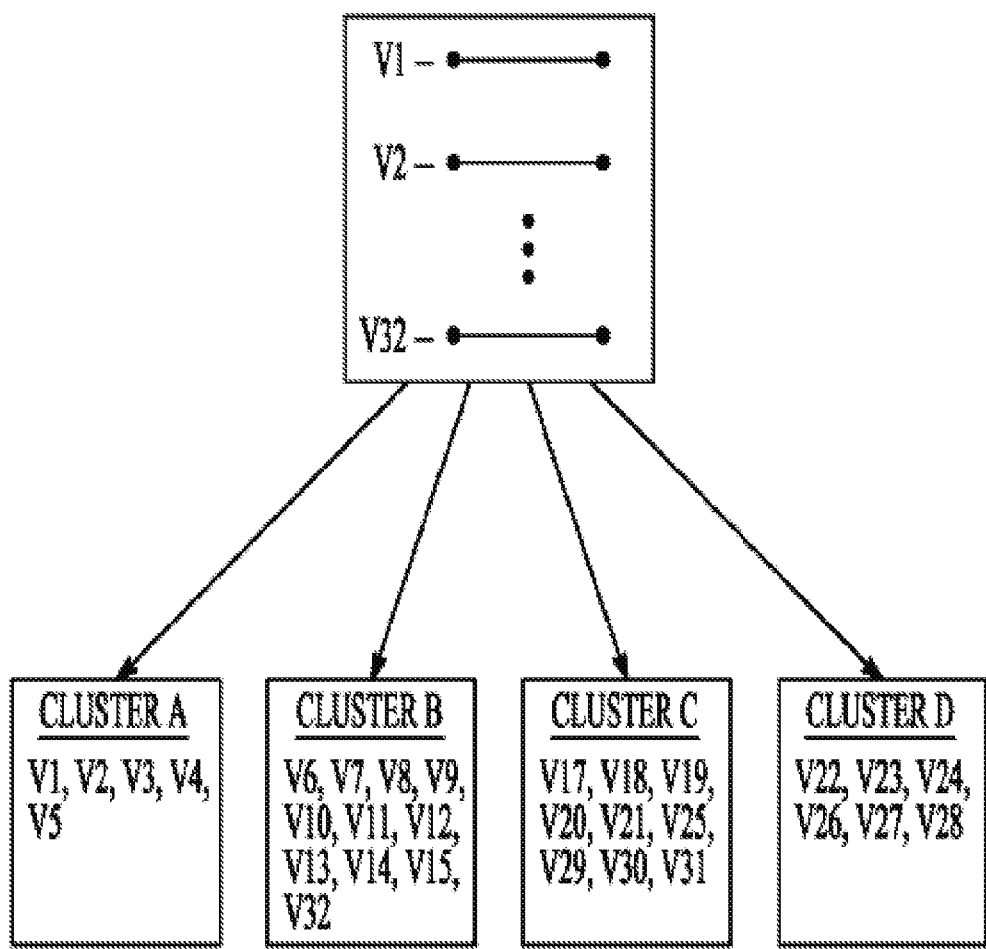
Figure 10B:
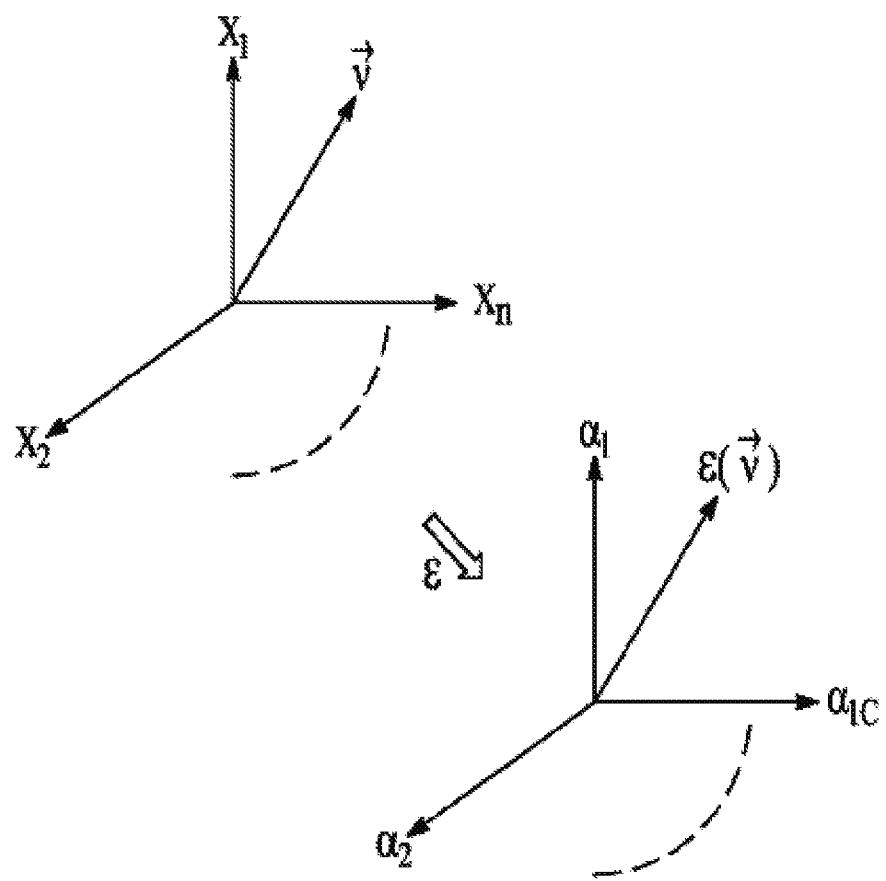
Figure 11:
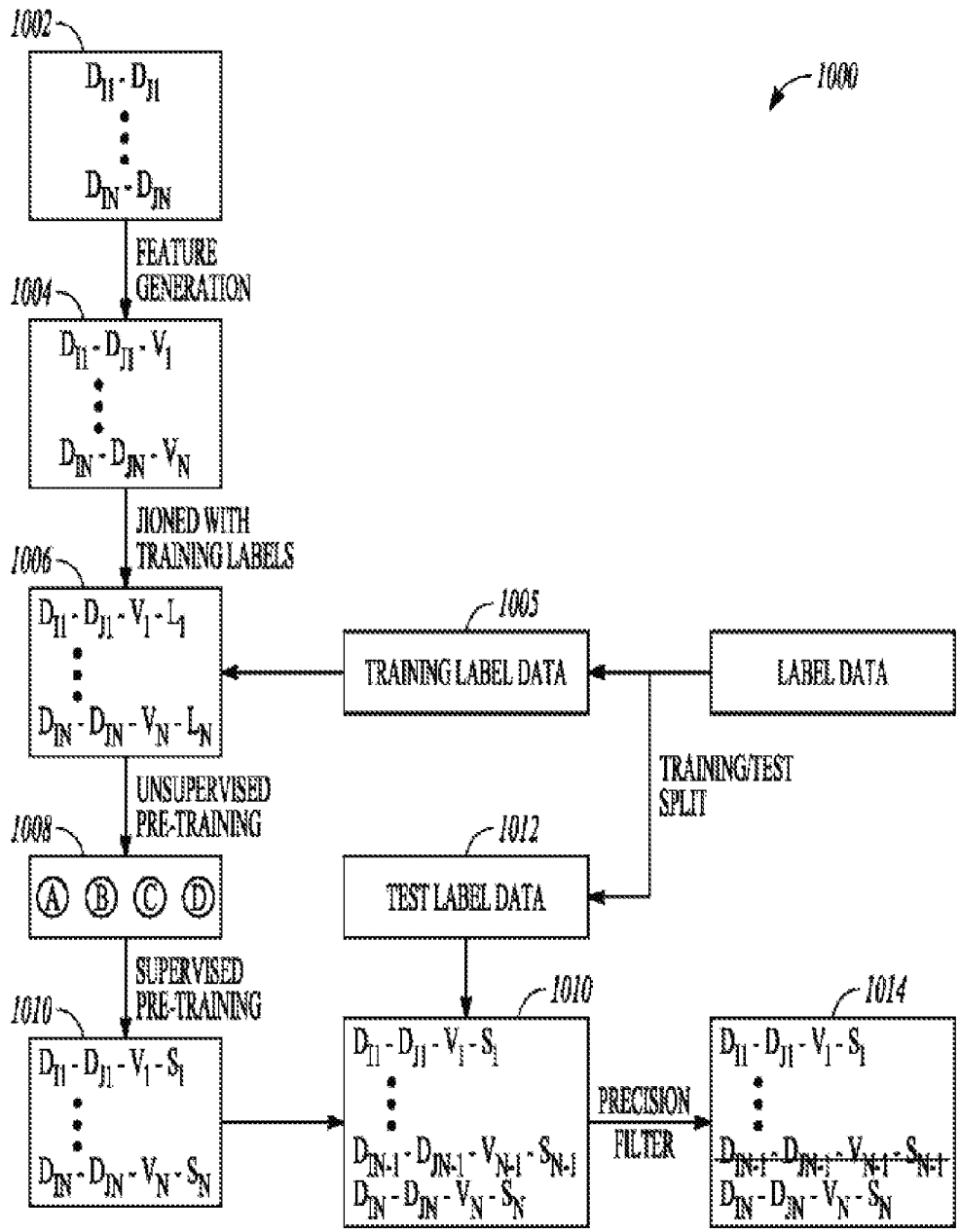
Figure 12:
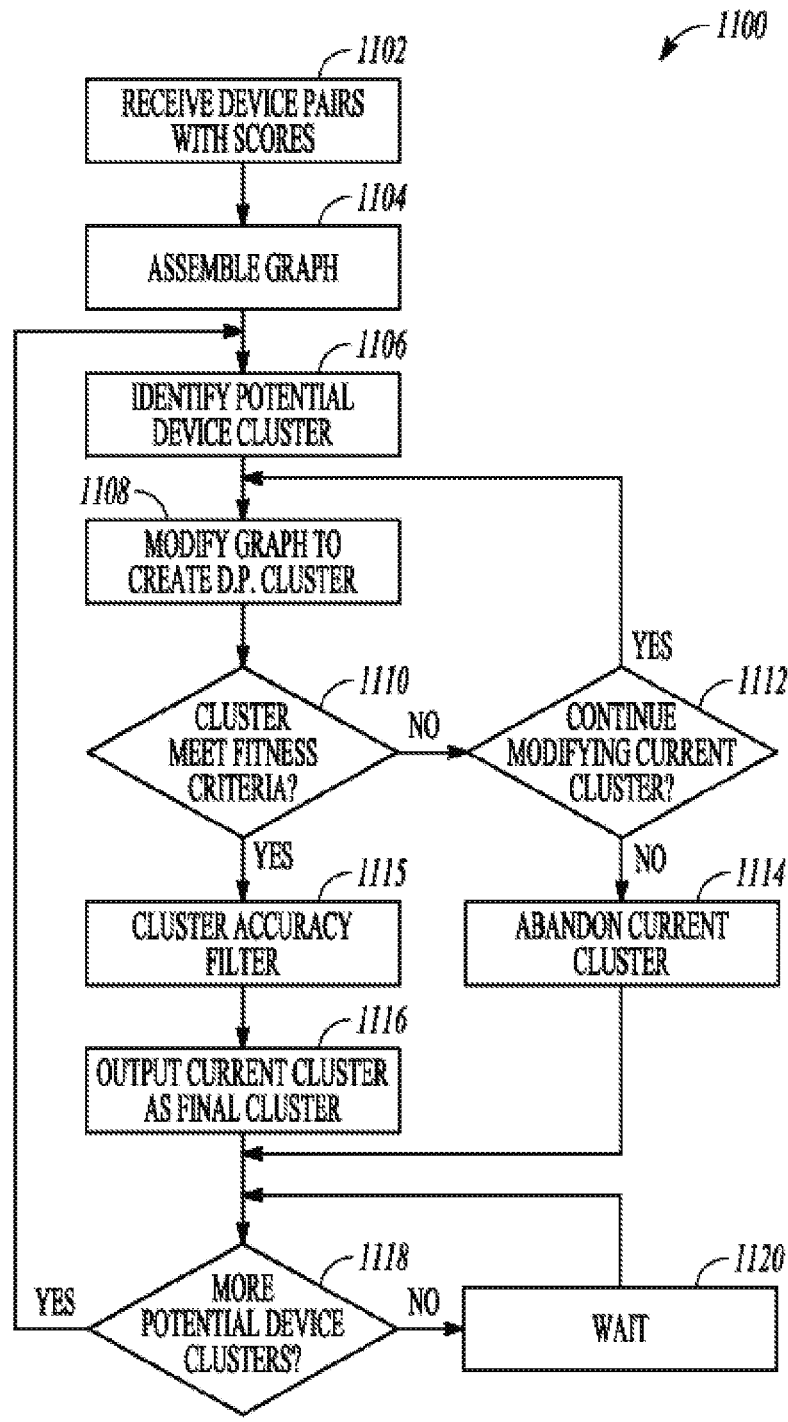
Figure 13:
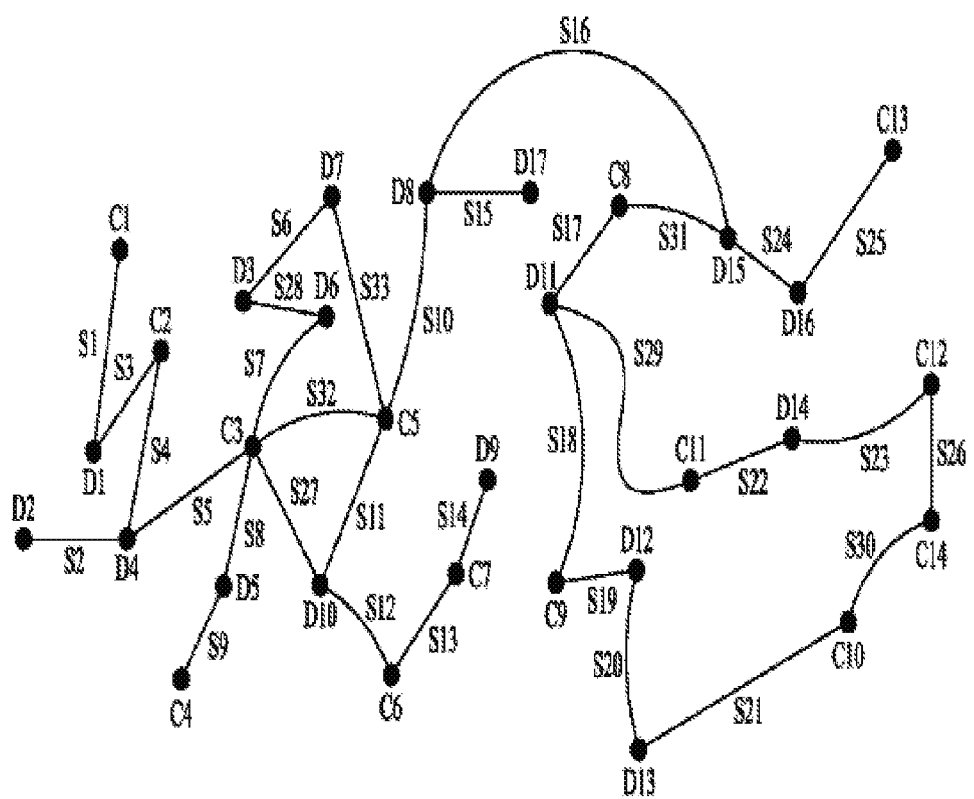
Figure 14:
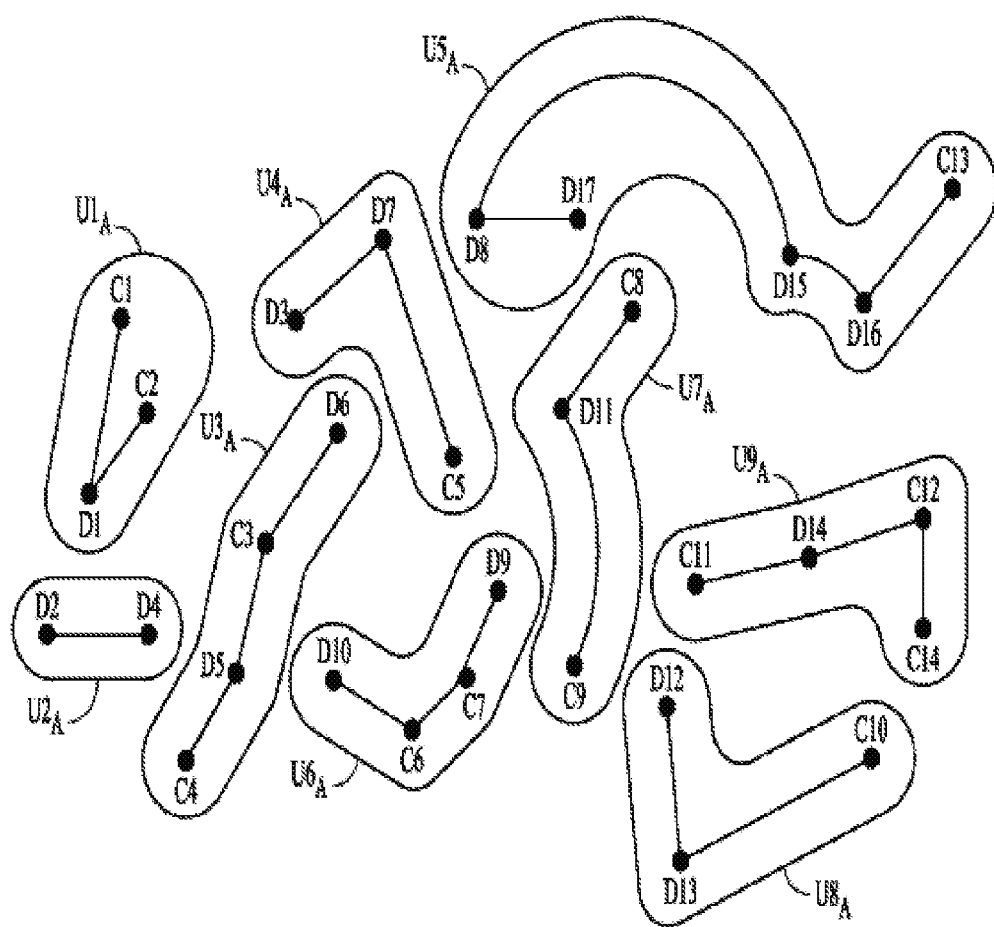
Figure 16:
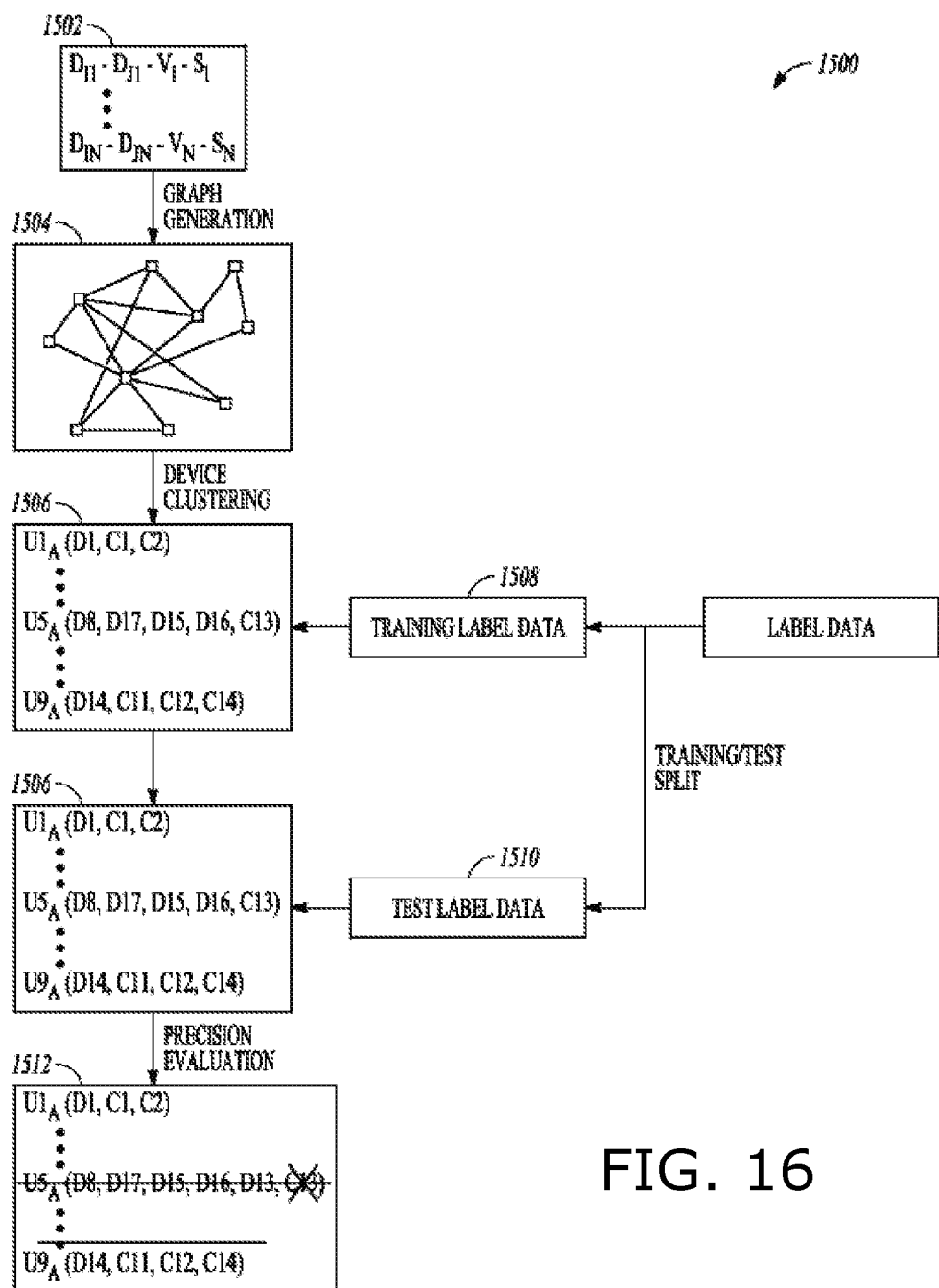
Figure 17:
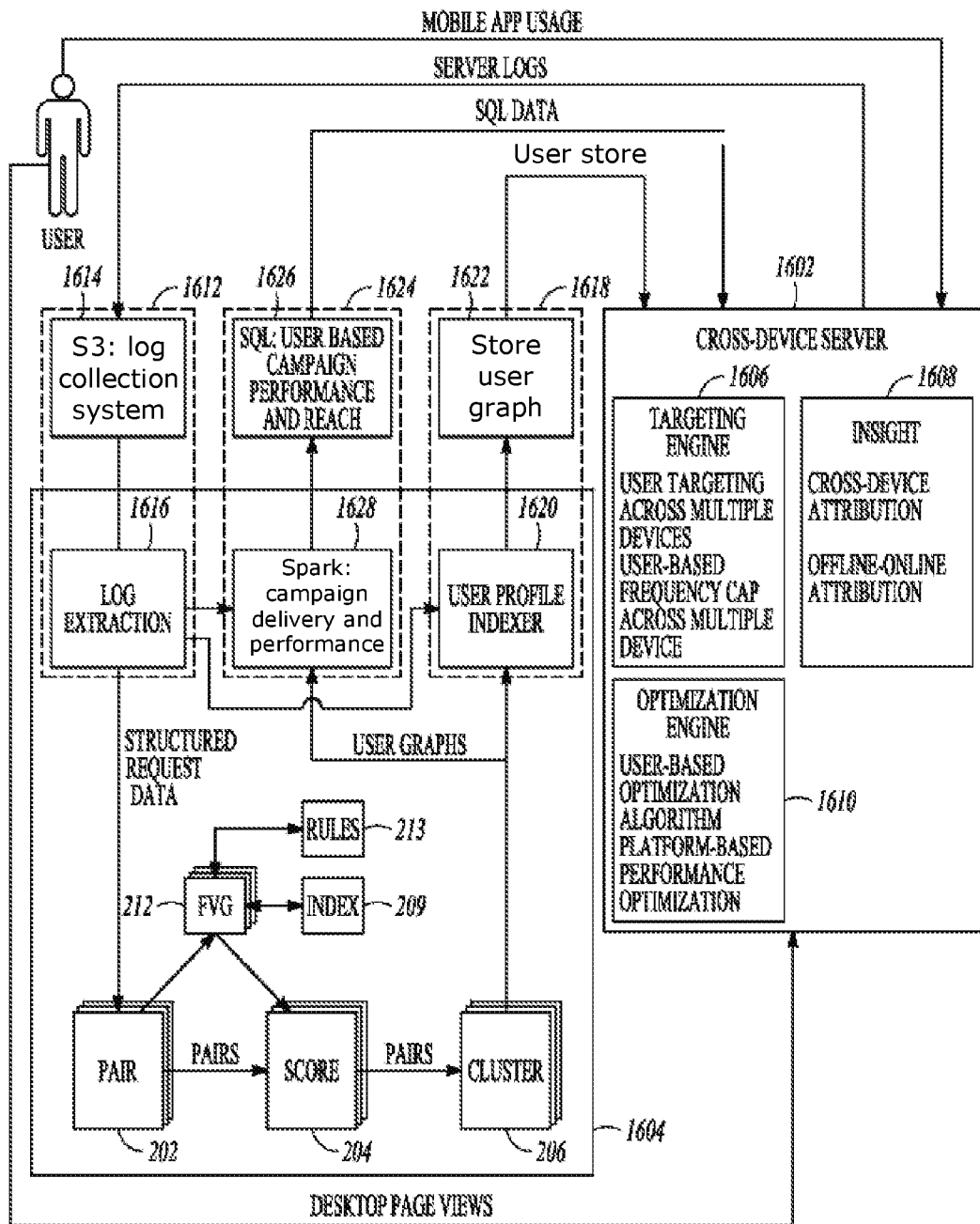

FIG. 6A is an illustrative flow diagram of a process representing example details of a first example rule applied according to the process of FIG. 5, to produce an example feature value as a function of feature information associated with a candidate device pair, pursuant to embodiments of the present disclosure FIG. 6B is an illustrative flow diagram of a process representing example details of a second example rule applied according to the process of FIG. 5, to produce an example feature value as a function of feature information associated with the candidate device pair, pursuant to embodiments of the present disclosure;

FIG. 7 is an illustrative chart providing examples of lower level feature information within an input storage system and rules within a rule storage of the system of FIG. 2 that are used to produced feature values, pursuant to embodiments of the present disclosure;

FIG. 8A is an illustrative flow diagram representing a configuration of a scoring engine of the data processing system of FIG. 2, pursuant to embodiments of the present disclosure;

FIGS. 8B to 8E are illustrative diagrams representing an alternative configuration of a scoring engine of the data processing system of FIG. 2, pursuant to embodiments of the present disclosure;

FIG. 9 is an illustrative flow diagram representing details of a training module of the scoring engine of FIG. 8A, optionally also for use with the scoring engine of FIGS. 8B to 8E, pursuant to embodiments of the present disclosure;

FIG. 10A is an illustrative drawing representing example in which an unsupervised pre-training module is operable to remap the device pairs of FIG. 7 to device pair clusters based upon the sample device pair feature vectors, pursuant to embodiments of the present disclosure;

FIG. 10B is an illustrative drawing representing use of a remapping module of the training module of FIG. 9, pursuant to embodiments of the present disclosure;

FIG. 11 is an illustrative diagram representing a data flow process including data transformations that occur within computer readable storage devices within the scoring engine of the data processing system of FIG. 2, pursuant to embodiments of the present disclosure;

FIG. 12 is an illustrative flow diagram representing a configuration of a cluster engine of the system of FIG. 2, pursuant to embodiments of the present disclosure;

FIG. 13 is an illustrative drawing representing an example graph produced using the cluster engine of FIG. 12 for the device pairs of FIGS. 4A and 4B, pursuant to embodiments of the present disclosure;

FIG. 14 is an illustrative drawing representing a set of example proposed user device clusters user device clusters identified using the cluster engine of FIG. 12 within the graph of FIG. 13, pursuant to embodiments of the present disclosure;

FIG. 15 is an illustrative drawing representing an example set of final device clusters produced using the cluster engine of FIG. 12 based upon the proposed user device clusters of FIG. 14, pursuant to embodiments of the present disclosure;

FIG. 16 is an illustrative diagram representing a data flow process diagram including data transformations that occur during user device clustering within the cluster engine of the data processing system of FIG. 2, pursuant to embodiments of the present disclosure; and FIG. 17 is an illustrative drawing representing the data processing system of FIG. 2 configured to operate in a network environment, pursuant to embodiments of the present disclosure.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE DISCLOSURE

In overview, there is provided below a description of embodiments of the present disclosure below that enables any person skilled in the art to create and use a data processing system to associate Internet connectable devices belonging to a same given user based upon anonymous Internet user data, namely "activity history" associated with the Internet connectable devices. Various modifications to the embodiments will be readily apparent to those skilled in the art. Identical reference numerals are potentially be used to represent different views of the same item in different drawings. Flow diagrams in drawings referenced below are used to represent processes. A machine such as a computer system that includes one or more processors and storage devices is configured to perform these processes. The flow diagrams represent configuration of one or more processors and/or storage devices of a computer system configured using computer program code to perform the acts described with reference to the flow diagrams.

Embodiments of the present disclosure provide a data processing system that is operable use raw or preprocessed data for associating devices with device attributes, for example device activity history; optionally, the raw or unprocessed data includes, for example, log files, bitstream data, and other network traffic containing either cookie or device identifiers. The data processing system employs in operation a pairing engine for determining device pairs based at least in part upon at least a portion of the aforementioned device attributes. Moreover, the data processing system employs a feature vector generation engine for producing feature vectors corresponding to determined device pairs, based at least in part upon feature values associated within the raw or preprocessed data with devices of the determined device pairs. Furthermore, the data processing system includes a scoring engine for determining scores for associating with determined device pairs based at least in part upon produced feature vectors associated with the determined device pairs. Additionally, the data processing system employs in operation a graph structure including nodes that represent devices of determined device pairs and including edges between pairs of nodes that indicate determined device pairs. In the data processing system, there is also employed a clustering engine for identifying respective clusters of nodes within the graph structure that represent respective groups of devices.

Figure 1A:
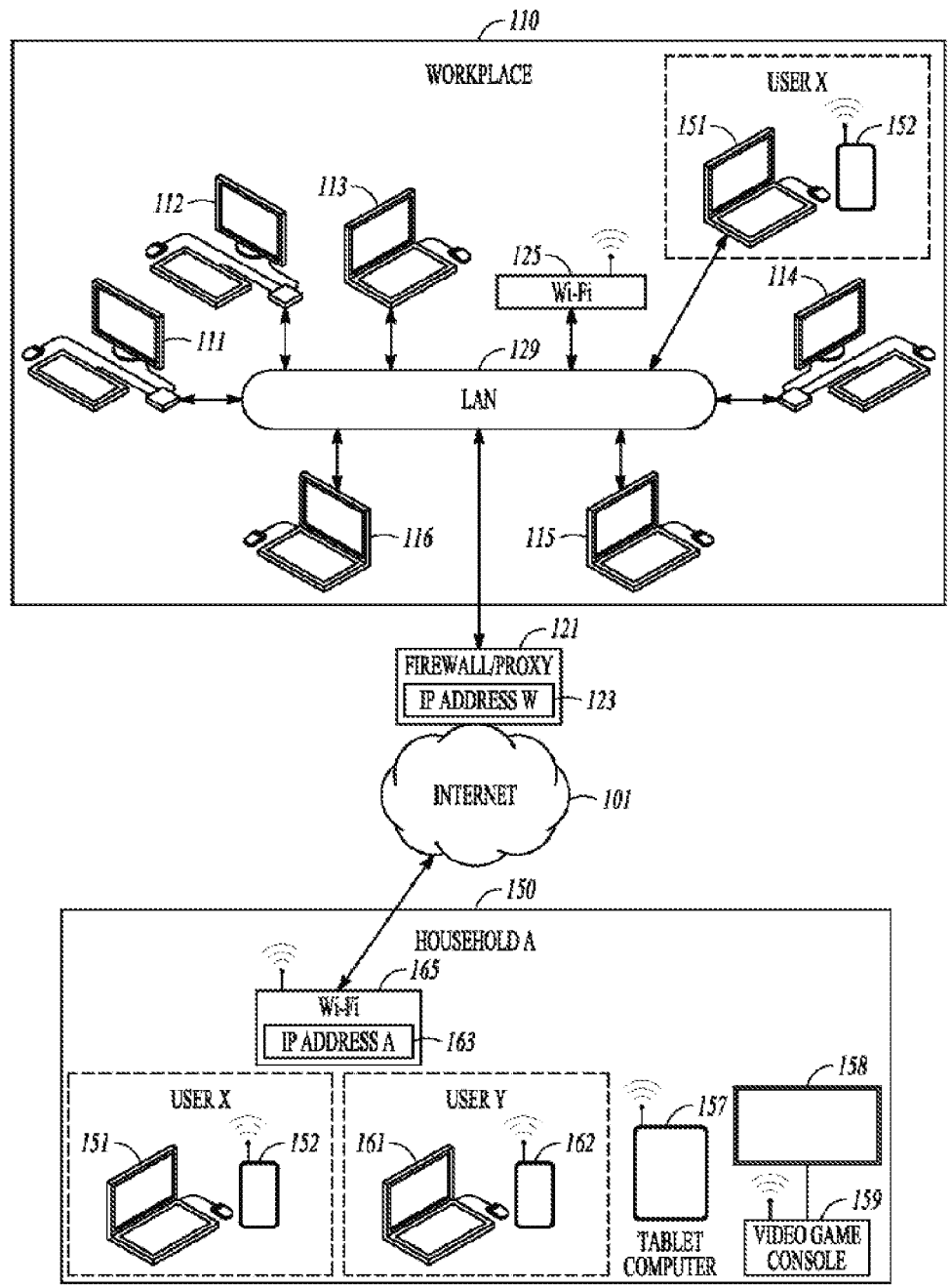
FIGS. 1A and 1B are illustrations of network connected device usage at different network addresses associated with different physical embodiments of the present disclosure.

Next, digital identity pairing will be described in overview with reference to FIG. 1A. At a given example household A, denoted by 150, there live people (namely "users") who use a plurality of mobile internet-connected digital devices to communicate with the Internet 101, or similar data communication network. Specifically, laptop computer systems (151 and 161), cellular phones (152 and 162), and a tablet computer system 157 are all mobile internet-connected digital devices, each having a unique device identifier. These mobile devices can be, and often are, taken with their one or more users to other locations that provide wireless (or wired) Internet access. For example, a given user X of the household A may use the laptop computer systems 151 and the cellular phones 152, both at the household A 150 and at a workplace W, denoted by 110.

When the given user X brings devices of the laptop computer systems 151 and the cellular phones 152 to a workplace W 110, those devices can no longer use a Wi-Fi router 165 to access the Internet 101. Instead, the given user X connects the laptop computer systems 151 to a local area network 129 at the workplace W 110 and configures the cellular phones 152 to use a local Wi-Fi network provided by a wireless access point, for example of the workplace W 110. With such two Internet connections, the given user X then will be able to access the Internet 101 using the laptop computer systems 151 and the cellular phones 152 through a firewall/proxy server 121 at the workplace W 110.

When the given user X is at home A 150, the laptop computer systems 151 and the cellular phones 152 will both use a single Internet Protocol (IP) address A 163 that is on the Wi-Fi router 165. Similarly, when that same given user X is at the workplace W 110, the laptop computer systems 151 and cellular phones 152 will both use the single IP address W 123 that is on the firewall/proxy server 121. Of course, the given user X can selectively send and receive information using one or the other or both of the laptop computer systems 151 and the cellular phones 152. However, a third party who communicates with the given user X over the laptop computer systems 151 may be unaware that the given user X also can be reached over the cellular phones 152, and a third party who communicates with the given user X over the cellular phones 152 may be unaware that the given user X also can be reached over the laptop computer systems 151.

Nevertheless, given the specific Internet usage pattern data described above with reference to FIG. 1A, an astute observer who knows nothing about the given user X and who is unaware that the given user X owns both the laptop computer systems 151 and the cellular phones 152 could make the rational inference that laptop computer systems 151 and cellular phones 152 are very likely used by the same person since the laptop computer systems 151 and cellular phones 152 are used together at both a household, namely at the home A 150, and also at the workplace W 110. After having made such an inference, a machine may link together a digital identifier associated with the laptop computer systems 151 and a digital identifier associated with cellular phones 152. Such a pairing of distinct digital identities to a single user is referred to as digital identity pairing.

Next, there will be provided a system overview, with reference to FIG. 2. There is provided in FIG. 2 an illustrative block diagram representing a system 200 in accordance with some embodiments of the present disclosure; the system 200 is also referred to as being a data processing system. The system 200 includes a computer readable storage device 208 to store device identifiers and indicia of features associated with the identified devices, a pairing engine 202, a feature vector generation (FVG) engine 212, a scoring engine 204 and a clustering engine 206. The pairing engine 202 identifies candidate device pairs based upon lower level preliminary pairing-identifying features indicated within the storage device 208 as associated with the devices of the candidate device pairs. It will be understood that the term "candidate" is used herein to indicate that the pairing determinations are preliminary and may undergo further evaluation in the scoring engine 204 and the clustering engine 206. The FVG engine 212 produces feature vectors in response to candidate device pairs as a function of additional feature information, namely device activity history, associated with individual devices of the candidate device pairs. More particularly, the pairing engine 202 provides to the FVG 212 candidate device pair identifiers. In response to the received candidate device pair identifiers, the FVG engine 212 uses individual identities of the devices of the candidate device pair to identify additional feature information, namely device activity history, associated within the storage device 208 with those individual devices of that candidate device pair. The FVG engine 212 generates feature vector values to associate with the identified candidate device pair as a function of the additional feature information, namely device activity history, identified as associated with individual devices of the identified candidate device pair. The scoring engine 204 determines scores to associate with identified candidate device pairs based at least in part upon feature vectors produced using the FVG engine 212. The clustering engine 206 produces a graph structure within a computer readable storage device that represents at least a portion of the identified candidate device pairs and the determined scores. The clustering engine 206 identifies digital identity clusters $U_1, U_2, \ldots U_N$ within the graph structure indicative of clusters or groups of devices that are associated with the same user.

In accordance with some embodiments, each individual cluster of digital identities stored within a storage device acts as a digital identity group communication structure $U_1, U_2, \ldots U_N$, comprising a group of devices that are associated with the same user and that can be used to communicate with the user who owns the grouped devices. Thus, for example, digital identity group communication structure $U_1$ includes devices $D_{A1}, D_{A2}, \ldots D_{AK}$. More specifically, digital identity groupings reveal the multiple devices that are grouped that can be used to communicate with the owner of the grouped devices. In contradistinction, in the absence of digital identity grouping, a third party who wishes to communicate with a particular device user cannot as readily identify the different devices over which to communicate with that particular device user. Thus, a digital identity group communication structure identifies a group of devices associated with the same user so as to expand the available avenues of communication with that user, thereby enhancing opportunities for communication with the user. It will be appreciated that device identity groups $U_1, U_2, \ldots U_N$ that previously were unknown to some third party wishing to communicate with users associated with the groups are determined based upon digital device pairings determined using the pairing engine 202, scoring using the scoring engine 204 based upon feature vectors produced using the FVG engine 212, and clustering using the clustering engine 206.

More particularly, in some embodiments of the present disclosure, the computer readable feature storage device 208 includes one or more storage devices that store aforementioned raw or preprocessed data 209 that associates device identifier information with lower level feature information, namely lower level device activity history, and label data. The lower level feature information can be stored within the storage device 208 itself or can be stored in a different storage location (not shown) indicated within the storage device 208. The low level data can be obtained from server logs of Internet connected device requests, for example. The system 200 includes a computer readable rules storage device 213 that stores rules used to generate higher level feature values based upon lower level feature information indicated within the storage device 208. More specifically, the rules storage device 213 stores instructions to configure the FVG engine 212 to identify additional higher level feature information, namely higher level device activity history, to associate with a candidate device pair, in response to the pairing engine 202, based upon lower level features associated with individual devices of candidate device pairs and to use the additional feature information, together with low level feature information, to produce feature values used within feature vectors. The system 200 includes buffer circuitry 210, 211 configured to receive as input certain lower level feature information and the label data, respectively. In some embodiments, the lower level feature information received within the buffer circuitry 210 includes deviceIDs, common source/destination identifiers (e.g. IP address), and timestamps.

The pairing engine 202 uses the preliminary pairing-identifying feature information such as a deviceID, a common source/destination identifier (e.g. IP address), and a timestamp to determine preliminary pairings of devices. As used herein, the term "device pair" refers to an information structure that is stored in a storage device and that indicates a pairing of distinct digital identities to a single user. The pairing engine 202 acts as a pre-filter that produces device pairs that represent a preliminary "candidate" pairing of devices. The pairing engine 202 also associates a preliminary pair score with each device pair, which provides an indication of a likelihood that the devices of the pair actually are associated with the same user.

The FVG engine 212 is configured to use a set of rules from the rules storage device 213 to produce feature vectors to associate with candidate device pairs as a function of lower level feature information, namely lower level device activity history, associated within the storage device 212 with the different individual devices of the candidate device pairs. The lower level feature information indicated within the storage device 212 includes user profile information associated with individual devices. The lower level feature information indicated within the storage device 208 may be gathered over the Internet and may include information such as demographic data such as age, gender or marital status and/or behavior (UK English: "behaviour") data such as user intent to purchase some item or personal interests such as likes or dislikes.

The scoring engine 204 receives as input, candidate device pair identifiers (such as deviceIDs of the devices within the pairs), associated preliminary pair scores produced by the pairing engine 202, associated feature vectors produced by the FVG engine 212, and associated label information. In some embodiments of the present disclosure, the preliminary pair scores associated with candidate device pairs that are produced using the pairing engine 202 are included as feature values of features vectors associated with candidate device pairs. The scoring engine 204 produces precision pair scores for the received device pairs as a function, at least in part, of their associated feature vectors. The precision pair scores produced using the scoring engine 204 are indicative of the likelihood that the device pairs in fact are associated with the same user. Pair scores produced by the scoring engine 204 preferably supplant the preliminary pair scores produced using the pairing engine 202.

In operation, the cluster engine 206 receives as input, device pairs and associated precision pair scores produced using the scoring engine 204. The cluster engine 206 produces a graph structure (not shown) within a computer readable storage device based upon the device pairs. Graph nodes represent devices associated with device identifiers. Graph edges indicate potential pairings of devices of candidate device pairs. Precision pair scores are associated with the graph edges. The cluster engine 206 identifies user device clusters within the graph based upon pair scores associated edge connections within the graph. The cluster engine 206 identifies groups of user devices that are associated with a common user. The cluster engine 206 stores in computer readable storage device 214 information that identifies respective groups of devices associated with respective users.

Example user device clusters $U._1, U._2, \ldots U._N$, which acts as digital identity group communication structures for corresponding owners of the devices in the clusters, that are identified using the clustering engine 206 are shown stored within the output storage system 214 associated with corresponding user identifier information. Different groups of device identifiers that are associated with the different respective users. Each cluster associates deviceIDs with a unique user, although the actual identity of the unique user is unknown. A first user device cluster $U._1$ indicated by device IDs ($D._{A1}, D._{A2}, \ldots, D._{AK}$) is associated with a unique user $U._1$, for example. Clusters of device IDs may be referred to herein as "device clusters" or "user device clusters".

In some embodiments of the present disclosure, the cluster engine 206 provides feedback F to the scoring engine 204. One example feature value considered by the scoring engine 204, in accordance with some embodiments of the present disclosure, is an indication of the number of additional devices indicated in the graph as potentially paired to a device of a candidate device pair. This example indication provides a view of the larger picture that is not necessarily present in the triad information alone. This additional potential pairing information is an example of "feedback" F through which the cluster engine 206 can affect precision scores produced using the scoring engine 204, which in turn, can influence precision scores associated with edges of the graph structure.

Moreover, for example, the cluster engine 206 can provide a previous precision pair score as the feedback F to the scoring engine 204 for determination by the scoring engine 204 of a later updated precision pair score. A previous pair score produced using the score engine 204 can allow the scoring engine 204 to determine a new updated pair score to improve upon a previous pair score that was generated when more limited information about a candidate device pair was available, for example, when less feature information was available. It will be appreciated that identifying likely device pairs is a temporally iterative process, that potentially has a greater probability of prediction of a given pairing being correct as more information becomes available to the system 200.

Next, there will be described devices and device identifiers that are employed within the system 200 when in operation. As used herein, the terms "device ID" and "device identifier" and "digital identity" refer to an identifier for a user device, a user device program stored in a computer readable storage device, a user device information structure (for example, a software cookie) stored in a computer readable storage device or a device user identity, for example. As used herein, "computer readable" storage device refers to a non-transitory storage device from which stored information can be extracted using a programmable computer or device, such as a smartphone, for example. Examples of deviceIDs include web browser cookies, cellular telephone device identifiers, MAC addresses, userids, and other identifiers that are linked to a specific client device, client program, or device user. As used herein, the term "device" or "user device" is used generally to refer to digital entities such as laptop computer systems, desktop computer systems, the cellular phones, tablet computer system, smart watches, smart devices such as internet connected appliances, and web browsers, for example. The teachings of the present disclosure may be used with a wide variety of different deviceIDs. In an example of digital identity pairings that will be disclosed, web browser cookies on laptop computer systems, desktop computers, and device identifiers on cellular phone devices are used as deviceIDs. However, the disclosed techniques may be used with any other suitable deviceIDs that can be used to identify specific client devices, web browsers, users, or other digital identities. As used herein, the letter "D" is used to refer to a physical device such as a mobile phone and the letter "C" is used to refer to a cookie that is indicative of physical device such as a laptop computer, for example. It will be appreciated from the foregoing, that both a mobile phone and a browser cookie encoded in a computer readable storage device may be referred to herein as "devices".

Next, feature and feature information employed in operation in the system 200 will be described. As used herein, the term "features" refers to attributes associated with a device. As used herein, the term "feature information" refers to information indicative of one or more features, for example device activity history. In accordance with some embodiments of the present disclosure, feature information is collected through observing Internet communications. In accordance with some embodiments, feature information is used to produce feature values that are constituent components of feature vectors.

For example, lower level feature information includes information such as:

(i) source device attributes for example, iPad, ID for installed applications (for example, the application named, "Words with Friends" is installed),
(ii) device user's ender, device ID, geographic location, dates, and so forth,
(iii) destination device attributes (for example, MacOSX installed, three other devices associated, and so forth),
(iv) contextual attributes (for example, web site topics, and so forth), and
(v) IP attributes (for example, how many unique devices have been observed on this IP address, how many days have has this IP address been observed).

In general, information relating to devices of device pairs comes from several broad categories:
(a) spatial and temporal observations,
(b) demographics, and
(c) satellite pairs.

Low level demographic information includes information such as:
(i) What are the age, gender, home location and consumer interests of the C and D sides of the pair?
(ii) Do the C and D descriptions appear consistent with one unique user?

Low level satellite pairs information includes information such as:
(a) Are there other pairs related to C or to D? (note: it will be appreciated that, in graph theory, two edges are called "incident" if they share an vertex);
(b) How do these pairs compare with the current pair?

Optionally, the satellite pairs information is an injection of information from the perspective of a device graph (described more fully below) back into a pairing prediction process.

The FVG engine 212 produces feature vectors that represent higher level feature information about a candidate device pair as a function of lower level feature information. More particularly, in some embodiments, the FVG engine 212 is configured to use rules to produce feature vectors as a function of device usage information, for example device activity history. In accordance with some embodiments of the present disclosure, many higher level features are developed based upon spatio-temporal information. In some embodiments, the feature vector generation engine 212 evaluates lower level features using spatio-temporal heuristics (for example, collect all observations for device A on IP address C, how often does device A appear on IP address C at night-time or during the weekends).

Figure 3:
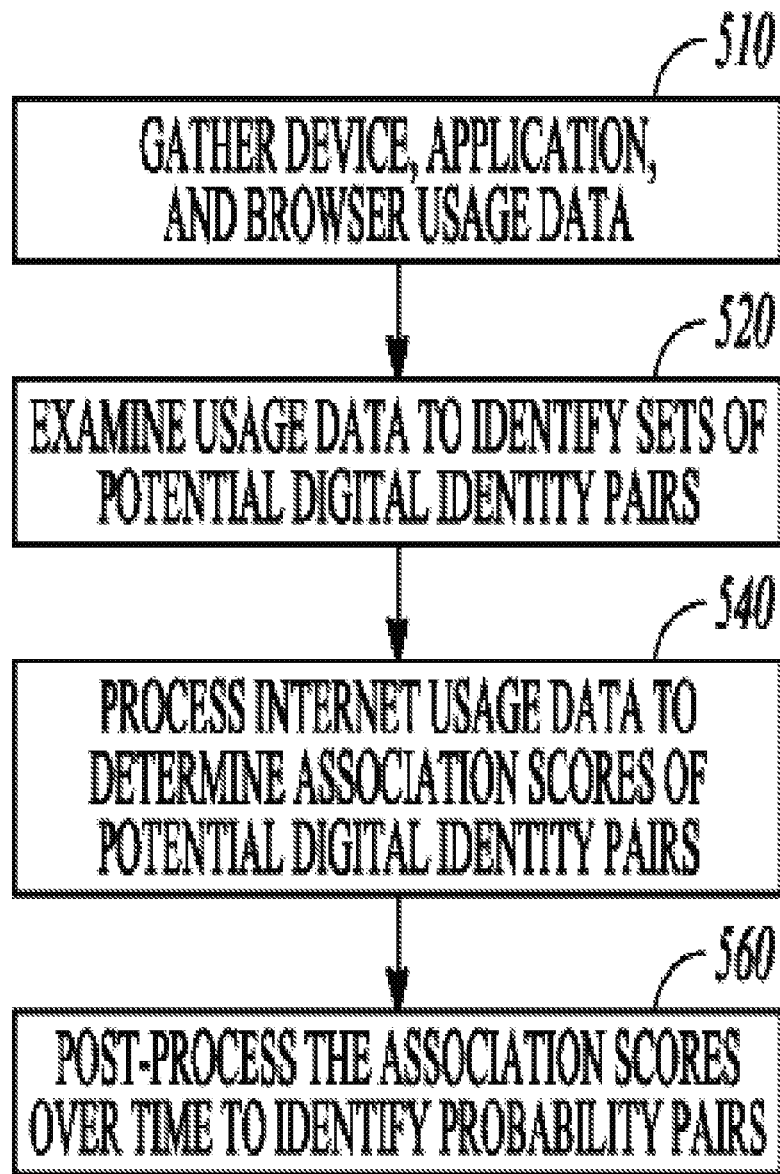
FIG. 3 is an illustrative process flow diagram representing a configuration of the digital identity pairing engine of the data processing system of FIG. 2 pursuant to embodiments of the present disclosure.

Next, the pairing engine 202 will be described in greater detail. Optionally, the pairing engine 202 is implemented in accordance with some embodiments as described in United States patent application US 1014/0095320, filed 10 May 1013, published 3 Apr. 2014; however, it will be appreciated that other types of implementation of the pairing engine 202 are also within the scope of the present disclosure, as will be elucidated in greater detail below. In FIG. 3, there is shown an illustrative process flow diagram representing an example configuration of the digital identity pairing engine of the system of FIG. 2 in accordance with in some embodiments of the present disclosure. Initially, the module 510 collects Internet usage data from the feature input storage system 208 for many different digital identities. In some embodiments of the present disclosure, the Internet usage data that is collected for analysis include data triads that include a client device deviceID, a network source/destination address identifier (for example, an IP address), and a timestamp.

A common source/destination identifier, in embodiments of the present disclosure, is the identity of some source or destination that client devices (as identified by their deviceIDs) will likely have in common if the two client devices are related. In the situation depicted in FIG. 1A, the IP addresses are the common source/destination identifier that may be used to link related client devices. Specifically, the digital identity pairing system may use a fact that the laptop computer systems 151, for example a given laptop computer system, and the cellular phones 152, for example a cellular phone, both share the IP address W 123 when at work and the IP address A 163 when at home to deduce that laptop computer systems 151 and cellular phones 152 are related client devices.

The timestamps in each data triad may be used to ensure that the data used is relevant. An ownership of given Internet connected devices may change over time such that very old Internet usage data, for example device activity history, should optionally not be used. In some embodiments of the present disclosure, the network source/destination addresses are implemented using IP (Internet Protocol) addresses. Many IP addresses are "dynamic addresses" that may be used by different entities at different times. Thus, Internet usage data observations should have relatively close temporal relations (when utilized in embodiments of the present disclosure) in order to provide accurate digital identity pairing results; such an approach will be described in greater detail later with reference to FIGS. 8B to 8E. In addition to ensuring that Internet usage observations are temporally proximate, certain embodiments of the disclosed system 200 use the timestamps of Internet usage data triads in a more sophisticated manner, as will be disclosed in a later section of the present disclosure.

The aforementioned triads of Internet usage data (deviceIDs, common source/destination identifier, and timestamp) may be collected by Internet web servers that track each Internet server request received. Alternatively, for example, in some embodiments of the present disclosure, individual application programs (such as games, media aggregators, utilities, and so forth) that run on client devices and report usage information to servers on the Internet also can be sources of usage data. For example, it is feasible to employ cookie-type software to provide data gathering for the system 200, namely to provide device activity history data.

Referring again to FIG. 3, after collecting Internet usage data, a next step in digital identity pairing, in accordance with some embodiments of the present disclosure, is to determine a set of candidate digital identity pairs. Generally, in an Internet environment, there are many millions of different digital identities involved in Internet activities every day. Attempting to analyze every possible permutation of digital identities as a potential digital identity pair would be an extremely difficult and probably a futile computational task. Thus, to reduce the size of the digital identity pairing problem, a module 520 analyzes the gathered Internet usage data to identify a much smaller number of candidate digital identity pairs that have a decent (namely plausible) probability of being related. In other words, a size of search space for determining associations between Internet requests and deviceIDs is limited by applying a pre-filter to the search space; such an approach reduces computation effort in the system 200 to a very considerable extent.

In embodiments of the present disclosure that use IP addresses as common source/destination identifiers, two different techniques are optionally used within the system 200 to select potential digital identity pairs for further analysis. A first strategy is to examine the number of different digital identities known to use the same IP address.

Specifically, if less than a threshold number of digital identities are known to use a specific IP address, then all of the different logical pairings of digital identities from that single IP address may be viewed as potential digital identity pairs. An associated reasoning is that if there are just a few different digital identities related to a single common IP, then there is a good probability that some of those different digital identities are associated with the same person and that one may be able to link statistically the digital identities belonging to that same person. For example, a family household that shares a single Internet account will likely have family members that use more than one digital identity that can be statistically linked in embodiments of the present disclosure.

In some embodiments of the present disclosure, for example, a threshold value is set to six such that if there are six or less digital identities seen at a particular IP address, then various logical combinations of those six or less digital identities may be considered potential digital identity pairs. For example, in FIG. 1A, the household A 150 has only six different digital devices (151, 152, 161, 162, 157, and 159) that couple to the Internet 101 through a single IP address A 163 on the Wi-Fi router 165 such that the various digital devices in the household A 150 may be considered as candidate digital identity pairs. In contradistinction, a very large number of digital devices couple to the Internet 101 though the single IP address W 123 at the workplace W 110 such that the digital identity pairing system does not immediately consider all of the combinations of digital devices at the workplace 110 as potential digital identity pairs. In effect, the system 200 identifies family households (which often have less than six Internet-connected devices) and then attempts to pair up digital devices from the family household that are used by the same user. Such an approach therefore employs a simple rule that allows for devices of a given client to be identified in the system 200.

In another embodiment of the present disclosure, the digital identity pairing system considers the specific IP address origin and determines whether or not that IP address is an address where paired digital identities are likely to be found (such as household residences as set forth above). The static IP addresses on the Internet are commonly allocated by the Internet Corporation for Assigned Names and Numbers (ICANN). By examining who owns a particular IP address, it is feasible to make a determination as to whether or not it will be easy to identify related digital identities that may be located at that IP address. Thus, for example, IP addresses that are used by an Internet service provider (ISP) to provide residential internet service may be good IP addresses to use when identifying potential digital identity pairs. Various other systems of identifying residential household IP addresses may also be used. In addition, other techniques of identifying likely digital identity pairs may also be used in the module 520 in addition to or instead of the systems for identifying residential households.

After selection of sets of potential digital identity pairs using the module 520, a module 540 then processes the gathered Internet usage data, namely the gathered featured information, specifically the triad information, to determine preliminary pair scores for the candidate digital identity pairings. Since the observed Internet usage data will vary over time and certain chance activities may cause false digital identity associations to be detected, the preliminary pair scores produced using the pairing engine 202 may be post-processed to remove noise. For example, association scores may be smoothed out over time using various techniques, for example by employing a temporal moving average. Thus, at a stage 560, the association score data that has been generated over time may be post-processes pair scores produced using a module 540 such that outlier data points are largely filtered out. The stage 560, for example implemented as a module, produces a set of high probability digital identity pairings.

Figure 1B:
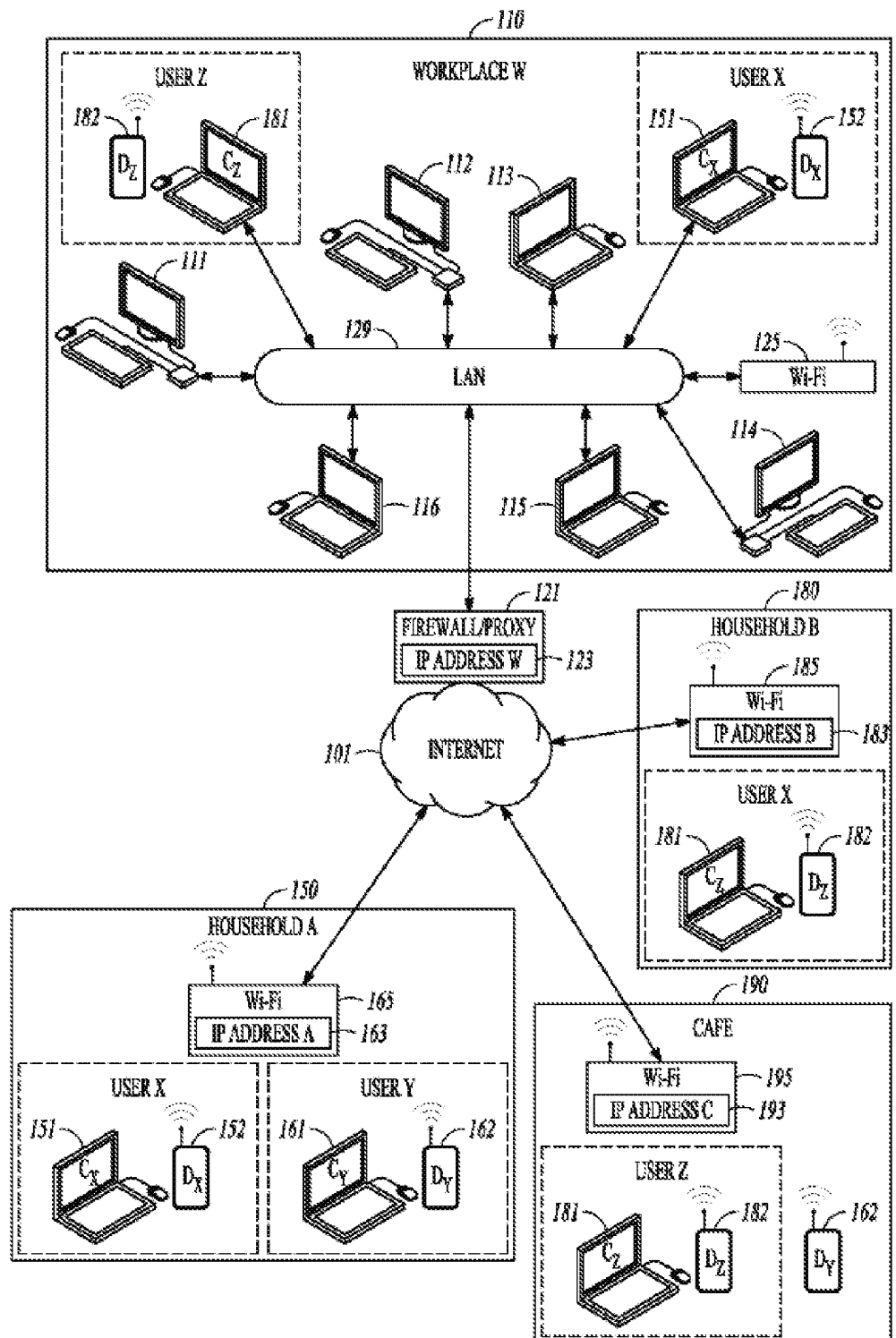

It will be appreciated that in some embodiments of the present disclosure, the preliminary pair scores produced using the pairing engine 202 provide a preliminary pair score that is more coarse, namely is less precise, than the pair score produced using the scoring engine 204. In some embodiments of the present disclosure, in determining a precision pair score (namely, a "confidence score"), the score engine 204 takes into account the preliminary pair score produced using the pairing engine 202. The pairing engine 202 identifies these candidate device pairs, together with their associated preliminary pair scores, to the scoring engine 204. Moreover, as more fully explained below, the device IDs of identified candidate device pairs are used with the raw or preprocessed data 209 within storage device 208 to retrieve additional feature information, namely additional device activity history, for use by the FVG engine 212 to produce feature values corresponding to the candidate device pairs. Referring to FIG. 1B, there is shown an illustration of the household A 150 and the workplace W 110 of FIG. 1A with an additional household B 180 and a cyber cafe C 190. In the household A 150, there are two digital device users: a User X and a User Y. The User X regularly uses a laptop computer system 151 and a cellular phone 152, such that the digital identities of the laptop computer system 151 and the cellular phone 152 are identifiable as paired digital identities. The User X's laptop computer system 151 is digitally identified using a cookie (C) on a web browser such that it is indicated as $C_X$ and the user X's cellular phone b is digitally identified with a deviceID (D) such that it is indicated as $D_X$. This digital device referencing indication nomenclature will be used with the other laptop and cellular phones as well. The User Y of the household A 150 regularly uses the laptop computer system $C_Y$ 161 and the cellular phone $D_Y$ 162 such that $C_Y$ 161 and $D_Y$ 162 are also identifiable as a related pair of digital identities. It will be appreciate that all of the digital devices ($C_X$ 151, $D_X$ 152, $C_Y$ 161, and $D_Y$ 162) in the household A 150 are operable to use the same IP address A 163 that is assigned to the Wi-Fi router 165 when those digital devices are used at the household A 150. Moreover, it will be appreciated that although this example embodiment is based upon using web browser cookies and mobile device identifiers, any other similar identifiers that can be associated with the digital devices may be optionally used.

A User Z residing at the household B 180 regularly uses a laptop computer system $C_Z$ 181181 and a cellular phone $D_Z$ 182182182. While at the household B 180, both $C_Z$ 181181 and $D_Z$ 182182182 will use an IP address B 183 that is assigned to the Wi-Fi router 185 in use at the household B 180. Both the user X and the user Z work together at the workplace W 110 such that $C_X$ 151, $D_X$ 152, $C_Z$ 181181, and $D_Z$ 182182182 are regularly used at the workplace W 110. While at the workplace W 110, those digital devices will all use an IP address W 123 that is assigned to the firewall/proxy 121 at the workplace W 110. Many other digital devices (111, 112, 113, 114, 115, and 116) will also use the IP address W 123 at workplace W 110.

Finally, referring to FIG. 1B, there is shown an illustration of a cyber cafe 190 that offers free Wi-Fi service to customers of the cyber cafe 190. The User Z and the user Y frequent the cyber cafe C 190 such that C.sub.Z 181181, D.sub.Z 182182182, and D.sub.Y 162 are illustrated at the cyber cafe 190 where an IP address C 193 is used on a Wi-Fi router 195. It will be appreciated that many other visitors (not shown) will also frequent the cyber cafe 190. However, the various digital devices that are only seen together at the cyber cafe 190 will not be considered potential digital identity pairs since there are too many digital identity pairings seen together at the cyber cafe 190.

After collecting Internet usage data (as explained with reference to the module 510), the next step in identifying digital identity pairs is to select a set of potential digital identity pairs as explained with reference to 520 of FIG. 3. As set forth in the previous section, the various combinations of digital identities that are associated with IP addresses having six or less digital identities may be selected as potential digital identity pairings. In the example of FIG. 1B, the various combinations of the digital devices at the households A 150 and B 180 are therefore considered candidate digital identity pairs. (The workplace W 110 and the cyber cafe C 190 have too many different digital identities associated with them and thus do not provide good candidates for digital identity pairs.) For simplicity, only the possible digital identity pairings (C.sub.X, D.sub.X), (C.sub.X, D.sub.Y), (C.sub.Y, D.sub.X), and (C.sub.Y, D.sub.Y) from the household A 110 will be analyzed in this example.

In one particular embodiment of the present disclosure, for example, the pairing engine 202 uses a variation of Bayesian probability analysis to calculate a preliminary pair score, also referred to as an "association" score, for each of the potential cookie and deviceID digital identity pairs. In some embodiments, a "support" score and "confidence" score also are determined. The support, confidence, and association scores may be defined as follows:

Support=P(cookie,deviceID)
Confidence=P(cookie,deviceID)
Association (cookie.fwdarw.deviceID)=P(cookie|deviceID)/P(cookie)

These three scores may be used to identify digital identity pairings and to rate the confidence in a digital identity pairing that has been made. The support score gives an indication of how much data support there is for the analysis of this particular cookie and deviceID pair. The confidence score gives an indication of how much confidence there is in the preliminary pair score, also referred to as an association score. The preliminary pair score produced using the pairing engine 202 provide a rating of how closely the cookie and deviceID are associated. In some embodiments of the present disclosure, the preliminary pair score produced using the pairing engine 202 is used as a feature in score engine 204.

In some embodiments of the present disclosure, the support score, confidence score, and preliminary pair (association) score are optionally calculated using the Internet usage, triad feature information, described above. The following relationships describe how the Internet usage information is used in accordance with some embodiments to calculate the support, confidence, and preliminary pair (association) scores:

co-occurrences(cookie, deviceID)=number of times both a given cookie and a given deviceID relate to the same location (namely, same source identifier IP address).
P(cookie, deviceID)=co-occurrences(cookie, deviceID)/total sample size
P(cookie\deviceID)=co-occurrences(cookie, deviceID)/occurrences(deviceID)
P(cookie)=number of occurrence (cookie)/total sample size Referring next to FIG. 4A, there is shown an illustrative drawing representing a plurality of example candidate device pairs and preliminary pair scores identified using the pairing engine 202 of FIG. 2. For example, a device pair data structure associates a preliminary pair score S3 with a candidate device pair having a device identifier D1 and having a cookie identifier C2. It will be appreciated that, in accordance with some embodiments of the present disclosure, a preliminary pair score S3 is a value between 0 and 1; however, in certain situations, the preliminary pair score S3 can be greater than 1. The candidate device pairs and their corresponding preliminary scores are provided as input to the score engine 204. In some embodiments of the present disclosure, the preliminary scores are provided as feature values within feature vectors.

Next, feature vectors employed in operation of the system 200 will be described in greater detail. As used herein, a feature vector refers to a set including multiple feature values that are associated with a candidate device pair. Moreover, feature vectors are information structures stored in a computer readable storage. Each feature value represents one or more features associated with a candidate device pair.

In accordance with some embodiments of the present disclosure, feature vectors are used to evaluate correlations between identified device pairs during training of the scoring engine 204. The FVG engine 212 produces feature values that are included within a feature vector as a function of feature information, namely activity history, that may be associated with the individual devices of a candidate device pair, or with the pair of devices, and with one or more rules. Thus, in some embodiments of the present disclosure, for example, each feature vector represents N features (for example, F.sub.1, F.sub.2, F.sub.3, F.sub.4, . . . , F.sub.N). In some embodiments of the present disclosure, each candidate device pair is associated with a feature vector (V) in which each feature has an integer numerical value (F.sub.value1, F.sub.value2, . . . F.sub.valueN) that indicates the state of that feature as relates to the associated device pair; optionally, each feature can have a fractional value, for example a probability-indicative value, and rules are implemented to take into account such fractional values. Thus, for example, the FVG engine 212 uses a rule to produce a given feature vector value F.sub.value1 based upon feature information, namely activity history, associated with F.sub.1 features associated with the devices of the pair; there is then used a different rule to produce a feature vector value F.sub.value2 based upon different feature information associated with F.sub.2 features associated with the devices of the pair; and so forth, for example.

Next, the feature vector generation engine will be described in greater detail. In FIG. 5, there is shown an illustrative process flow diagram 300 representing a configuration of the FVG engine 212 in accordance with some embodiments of the present disclosure. Modules of the diagram correspond to computer program code (not shown) that is operable to configure a computer system that includes one or more processors and/or control components to cause performance of specific acts represented by the different modules. In operation, a module 302 selects a candidate device pair. Moreover, a module 303 uses the raw or preprocessed data 209 stored within the storage device 208 to retrieve stored feature information associated, namely device activity history, with individual device IDs of the selected pair. Furthermore, a module 304 selects a rule from the rules storage device 213. Additionally, a module 306 produces a feature value, for use in a feature vector, based upon the retrieved feature information, namely activity history, and the currently selected rule.

A decision module 308 determines whether or not there are additional rules to apply to the currently feature information, namely activity history, associated with the devices of the selected candidate device pair. In response to a decision (based on applying rules) by the module 308 that additional rules are to be applied to the currently selected candidate device pair, control flows back to the module 304 and another rule is selected. Which rules to apply to a candidate device pair, for example, may depend upon what feature information, namely activity history, is available for the pair. Conversely, in response to a determination by decision the module 308 that no additional rules are to be applied to the currently selected candidate device pair, a module 310 provides to the scoring engine 204 a feature vector that includes feature values produced based upon individual feature information associated with the individual devices of the currently selected candidate device pair, and a decision module 312 determines whether or not the feature input storage system 208 includes additional device pairs to evaluate. In response to a determination by the decision module 312 that additional device pairs are to be evaluated, control flows to the module 302 and another candidate device pair is selected. Conversely, in response to a determination by the decision module 312 that no additional device pairs are to be evaluated, the process ends and awaits identification of additional candidate device pairs.

It will be appreciated that in accordance with some embodiments of the present disclosure, the pairing engine 202 provides a preliminary determination of candidate device pairs. The initial candidate pair determination is used as an index for use to search the feature input storage system 208 for separate and possibly different feature information, activity history, associated with the separate different devices of a currently selected candidate device pairs. The FVG engine 212 applies one or more rules from the rules storage device 213 to the separate and possibly different information identified using the pairing-engine-provided index information so as to produce feature values used to produce a feature vector associated with selected candidate device pair.

For example, a candidate device pair may include a laptop computer and a smartphone. Separate Internet usage information, also referred to herein as low level feature information, may be collected separately for the laptop and for the smartphone. Such raw or preprocessed data 209 is then used to identify usage information collected for the laptop and to identify separately collected usage information collected for the smartphone. In the module 306, the FVG engine 212 applies one or more rules to produce a feature vector value for the device pair based upon the usage information collected separately for the two devices of the pair. The usage information, for example, optionally includes device activity history.

It will be further understood, as explained more fully below, that the produced feature vectors of numerous candidate device pairs are used to produce precision pair scores for numerous corresponding candidate device pairs. FIG. 4B is an illustrative drawing representing the example device pairs of FIG. 4A associated with example feature vectors V1 to V33 in accordance with some embodiments of the present disclosure. In some embodiments of the present disclosure, weighting values (i.e. "weights") shown in FIG. 4A may be subsumed as individual feature values within feature vectors. More particularly, through supervised and unsupervised training, the scoring engine 204 produces precision pair scores to associate with the candidate device pairs identified by the pairing engine 202. The precision pair scores produced using the scoring engine 204 are used, in turn, by the clustering engine 206 to facilitate clustering of user devices.

FIG. 6A is an illustrative flow diagram of a process 650 representing example details of an example first rule applied by the module 306 to produce an example higher level feature value as a function of the lower level feature information associated in the raw or preprocessed data 209 with two devices of an example candidate device pair identified using the pairing engine 202, in accordance with some embodiments of the present disclosure. It will be appreciated that the raw or preprocessed data 209 can be diverse in nature, and does not in any way resemble any form of index structure; for example, the data 209 includes device activity history as a chronological sequence of Internet events. Moreover, it will be appreciated that the module 306 configures the FVG engine 212 according to details of the rule currently selected using the module 304; there is thereby produced a feature value based upon lower level feature information. The module 306 configures the FVG engine 212 differently to apply different rules. More particularly, in accordance with some embodiments, the module 306 uses instructions stored in the rules storage 213 to configure the FVG engine 212 according to a rule selected using the module 304 to determine a feature value for a higher level feature based upon lower level feature information selected using the module 303 associated with devices of a candidate device pair selected using the module 302. As used herein, a "higher" level feature is a feature that has a value that is dependent upon the values of one or more other features. A produced feature value indicates an attribute of the relationship between device C and device D.

The example first rule process 650 of FIG. 6A uses multiple pieces of lower level feature information indicated in the raw or preprocessed data 209 to produce a feature value for a feature indicative of the strength of the relationship between a candidate device pair includes device C and device D. As explained herein, a vector includes multiple feature values, each produced using a different rule. The example rule produces one of five possible feature values for the example feature: 0, 1, 2, 3, and 4. The higher level feature value produced using the example rule is included in a feature vector as explained more fully below. The example rule is, for example, hierarchical. It includes a hierarchy of branching determinations in which some determinations are predicates of other dependent determinations. Referring to FIG. 6A, a first decision module 652 determines whether or not both devices of the example candidate device pair C and D access information from the same IAB category, such as an Interactive Advertising Bureau (IAB) category. The first decision module 652 produces in operation a feature value of 0 in response to a determination that C and D do not access the content with the same category. The first rule process 650 ends with production of feature value 0 if C and D do not access the content with the same category.

In response to the first decision module 652 determining in operation that both devices of the example candidate device pair access information from the same category, a second decision module 654 determines whether or not the category is sports. The second decision module 654 produces a feature value of 1 in response to a determination that that although both C and D access the content with the same category, the estimated geographic locations of devices C and D are more than one-hundred miles apart. The first rule process 650 ends with production of feature value 1 if C and D access the content with the same category but devices C and D are located more than one-hundred miles apart.

In response to the second decision module 654 determining that both devices access the sports category, a third decision module 656 determines whether or not either of the two devices accesses the sports content during times on weekends or during times in the evenings. The third decision module 656 produces a feature value of 2 in response to a determination that neither device C nor device D accesses sports content during weekends or evenings. The first process 650 ends with production of feature value 2 if both device C and device D access sports content but neither of them accesses sports content during weekends or evenings.

In response to the third decision module 656 determining that at least one of the devices accesses the sports category on the weekend or in the evening, a fourth decision module 658 determines whether only one or both of the two devices accesses the sports category on the weekend or in the evening. The fourth decision module 658 produces a feature value of 3 in response to a determination that only on or the other of the two devices accesses the sports category on the weekend or in the evening. The fourth decision module 658 produces a feature value of 4 in response to a determination that both of the two devices access the sports category on the weekend or in the evening.

FIG. 6B is an illustrative flow diagram of a process 660 representing example details of an example second rule applied by the module 306, in accordance with some embodiments of the present disclosure. The example second rule process 660 of FIG. 6B is applied to the same candidate pair, C and D, as in FIG. 6A, to produce one of six possible feature values for the example feature: 0, 1, 2, 3, 4, and 5. A first decision module 662 determines whether or not both devices of the example candidate device pair C and D access information from the same category. The first decision module 662 produces a feature value of 0 in response to a determination that C and D do not access the content with the same category. The process 660 ends with production of feature value 0 if C and D do not access the content with the same category.

In response to the first decision module 662 determining that both devices of the example candidate device pair access information from the same category, a second decision module 664 determines whether or not the devices C and D are geographically located within one-hundred miles of each other. The second decision module 664 produces a feature value of 1 in response to a determination that that although both C and D access the content with the same category, they are not located within one-hundred and forty kilometers of each other. The second process 660 ends with production of feature value 1 if C and D access the content with the same category but are not located within one-hundred miles of each other.

In response to the second decision module 664 determining that the devices are located within one-hundred and forty kilometers of each other, a third decision module 666 determines whether or not the category is sports related. The third decision module 666 produces a feature value of 2 in response to a determination that the category is not sports related. The second process 660 ends with production of feature value 2 if both device C and device D access the same category are located within one-hundred and forty kilometers (100 miles) of each other, but that the category is not sports related.

In response to the third decision module 666 determining that the accessed content is sports related, a fourth decision module 668 determines whether neither, only one, or both of the two devices accesses the soccer sports category on the weekend or in the evening. The fourth decision module 668 produces a feature value of 3 in response to a determination that neither devices accesses soccer sports related content on the weekends or evenings. The fourth decision module 668 produces a feature value of 4 in response to a determination that only on or the other of the two devices accesses the sports category on the weekend or in the evening. The fourth decision module 668 produces a feature value of 5 in response to a determination that both of the two devices access the sports category on the weekend or in the evening.

It will be appreciated that the rules processes of FIGS. 6A to 6B provide two example rules applied by the FVG engine 212 to produce example feature values for higher level features produced based upon lower level feature information. It will be understood that the feature vector generation (FVG) engine 212 is configured to apply numerous rules to determine numerous corresponding features values to include in a feature vector based upon observed lower level feature information.

Thus, the FVG engine 212 produces high level feature values (or example, 0, 1, 2, 3, 4, 5) using low level feature information and a set of pre-defined rules. In some embodiments, generating higher level feature values involves using heterogeneous lower level features such as features indicative of:
(i) one or more categories (for example, IAB categories);
(ii) one or more geographical locations (for example, mutually within one-hundred and forty kilometers (100 miles)); and
(iii) one or more times (for example, on weekends or evenings).

Moreover, in some embodiments of the present disclosure generating a high level feature value involves applying multiple rules in a sequential order (for example, decision modules 662, 664, 666 and 668 each implements pre-defined rules in a pre-defined order).

Each rule in the example sequence produces a higher level feature. As the FVG engine 212 applies the sequence of example rules, lower level features are blended with higher level features. In particular, for example, the first decision module 662 can produce a feature value 0 based upon only one low level feature, namely a category. The second decision module 664 can produce a value of 1 to represent a higher level feature that represents a combination of a lower level category feature and a geographic proximity feature. The third decision module 666 can produce a feature value of 2 based upon a higher level feature that represents a combination of a lower level category feature, a geographic proximity feature, and a sports category feature. The fourth decision module 668 can produce a feature value of 3, 4, or 5 based upon a combination of a lower level category feature, a geographic proximity feature, a sports category feature, and a time-frame feature.

In FIG. 7, there is shown an illustrative chart providing examples of low level feature information within an input storage system 208 and rules within a rule storage 213 of the system of FIG. 2 that are used to produced feature values in accordance with some embodiments of the present disclosure. Many of the example rules in the table are relatively rough descriptors of the observation history for a device C, a device D and an IP address. It will be understood that not all rules will be applicable to every potential device pair and that only some portion of the rules may be applicable to any given device pair.

Next, labels as employed in operation in the system 200 will be elucidated in greater detail. Label information (namely ID pairs) stored in the storage device 208 is used to train the scoring engine 204 to generate device pair scores as a function of device pair feature vectors. More particularly, a given feature vector includes a label value associated with a corresponding device identifier. Labeled data are used to train the scoring engine 204 to determine the likelihood that both devices of an unlabeled device pair are associated with a same given user. The feature vectors associated with labeled device pairs are commonly referred to as "ground truths". Specifically, label data are provided to indicate feature vectors that are verifiably known to be associated with the same given user, and label data also are provided that indicate feature vectors that are verifiably known not to be associated with the same given user. These known device pair relationships are referred to herein as "labeled". In accordance with some embodiments of the present disclosure, each labeled device pair is associated with either a label−1 or a label+1. All other device pairs, referred to herein as "unlabeled", are associated with a label 0. As elucidated in the foregoing with reference to feature information, namely activity history, within the input storage system 208 and rules within the rules storage device 213, respective candidate device pairs are associated with respective feature vectors. Labeled device pairs with the label=−1 are associated with feature vectors known to be indicative of a pair of devices that is not associated with the same user. Labeled device pairs with the label=+1 are associated with feature vectors known to be indicative of a pair of devices that is associated with the same user. The labeled device pairs are used in the system 200 to learn during a training stage to assess whether or not feature vectors of respective unlabeled candidate device pairs are indicative of the respective candidate device pairs being associated with the same user.

Next, the score engine 204 will be described in greater detail. In FIG. 8A, there is shown an illustrative flow diagram 700 representing a configuration of the score engine 204 in accordance with some embodiments of the present disclosure. Modules of the diagram in FIG. 8A correspond to computer program code (not shown) that configures a computer system that includes one or more processors and/or control components to cause performance of the specific acts represented by the different modules. A module 702 associates candidate device pairs identified using the pairing engine 202 with feature vectors produced using the feature vector generation (FVG) engine 212. In some embodiments of the present disclosure, preliminary pair scores produced using the pairing engine 202 are incorporated into the feature vectors used to determine precision pair scores for associated candidate pairs. The module 702 also receives label information which it associates with candidate pairs and feature vectors. Each candidate device pair also is associated with a preliminary pair score. For example, the candidate device pair having device identifier D1 and a cookie identifier C2 is associated with feature vector V1 and with and with preliminary pair score S3.

Referring again to FIG. 8A, a module 704 identifies in operation unlabeled and labeled candidate device pairs from among the candidate device pairs received from the pairing engine 202. The module 704 provides the labeled device pairs to a label data selection module 705. The module 704 provides the unlabeled candidate device pairs to training a training module 706. The label data selection module 705 designates first labeled candidate device pairs (referred to as a "training set") for provision to the training module 706 for use in training a scoring model implemented using a scoring module 708 and designates second labeled candidate device pairs (referred to as "testing set") for provision to a testing module 709 for use in testing the quality of scores produced using the scoring model. In some embodiments of the present disclosure, the label data selection module 705 designates in a range of sixty to ninety percent, for example about eighty percent, of the received labeled candidate device pairs for use in training and designates about twenty percent of the received labeled candidate device pairs for use in testing.

The training module 706 evaluates correlations between feature vectors of the unlabeled candidate device pairs and feature vectors of the first labeled candidate device pairs that have been designated for use in training and determines pair scores to associate with the first candidate device pairs based upon the correlation evaluations. As explained above, feature vectors associated with unlabeled candidate pairs have a label=0, and feature vectors associated with labeled candidate device pairs have label=−1 or a label=+1. The training module 706 produces a scoring model used by a scoring module 708. The training module 706 produces a scoring model that associates model parameters with vector features. The training module 706 uses training data comprising an array of feature vectors associated with candidate device pairs and corresponding labels to determine model parameters. In accordance with some embodiments of the present disclosure, the determined model parameters are indicative of the importance of the features within a vector to a determination of whether or not the devices of a candidate device pair actually are associated with the same user. A goal of training is to produce a training model that minimizes a residual between model predictions and observed values in training label data.

The model parameters produced using the training module 706, used by the scoring model, are used to configure the feature-based scoring module 708. The scoring module 708 uses model parameters in the scoring model, combined with the feature vectors associated with candidate device pairs, to produce precision pair scores between 0 and 1 for the unlabeled candidate device pairs. A precision pair score for a candidate device pair represents a more accurate estimate than a corresponding preliminary pair score of likelihood that the devices of the candidate device pair actually are associated with the same user. In accordance with some embodiments of the present disclosure, a precision pair score is determined as a function of feature vectors (which may include a feature value indicative of a preliminary pair score) associated with each device pair and model parameters within the trained scoring model. Thus, the system 200 optionally employs an iterative process based upon:
  (i) proposing initial candidate pairs of devices;
  (ii) determining probabilities of association based upon device activity history; and
  (iii) selecting, based upon a probability of a given association of a pair of devices being above one or more threshold criteria, and repeating to (ii).

A score testing module 709 evaluates a quality of precision pair scores determined using the scoring model. In particular, the score testing module 709 determines precision pair score quality for candidate device pairs as a function of correlation between feature vectors of candidate device pairs and the second labeled candidate device pairs designated by the module 705 for use in testing. Candidate device pairs having precision pair scores that pass a score quality threshold, namely aforementioned "one or more threshold criteria", are passed to a module 710, that transmits the candidate device pairs and their precision pair scores to the cluster module 206. Candidate device pairs having precision pair scores that do not pass the score quality threshold are removed from use in the feature based scoring module 708.

In another example embodiment of the present disclosure, as shown in FIGS. 8B to 8D, processes to determining pairing of devices is shown in greater detail. In operation of the system 200, device activity history is beneficially temporally local, because old device activity history can be potentially misleading (for example, a given user sells his/her computer to another person, or buys a new smart phone). The system 200 therefore employs in operation a logic time T, with an incremental time T+ΔT. At the logic time T, following conditions pertain:
  (i) for a data set A, unlabeled pairs are identified for the logic time T; for example, candidate pairs generated at the logic time T that cannot be determined by Pippio data are extracted at the logic time T); "Pippio data" relates to analysis data that is output from data analysis software products supplied by Arbor Technologies Inc., USA;
  (ii) for the data set A, labelled pairs are identified for the logic time T (namely, candidate pairs that are generated at the logic time T that can be determined by Pippio data extracted at the logic time T); there are thereby determined B+ positive pairs in data B, and B− negative pairs in data B;
  (iii) the system 200 then generates a ML model at the logic time T, using B+ positive pairs and B− negative pairs at the logic time T, and is used to generate scores for the data set A to obtain an analysis result C;
  (iv) at the logic time T+ΔT, for a data set D, unlabeled pairs are identified, namely candidate pairs that cannot be determined from Pippio data extracted at the logic time T+ΔT;
  (v) at the logic time T+ΔT, for a data set E, label pair are identified, namely candidate pairs that cannot be determined from Pippio data extracted at the logic time T+ΔT, wherein there are then E+ positive pairs in the data set E and E− negative pairs in the data set E;
  (vi) from (i) to (v) above, there is next computed, for a data set F, labelled pairs in the analysis result C at the logic time T, namely the scored pairs C at the logic time T that can be determined by Pippio data extracted at the logic time T+ΔT, wherein there are F+ low confidence scores but with a positive label, and F− high confidence scores but with a negative label; and
  (vii) a new ML model is developed at the logic time T+ΔT using the identified pairs E+, F+, E−, F−, and the model is then used to generate scores for the data set D; there is thereby provided a feedback loop by using the F+ and F− pairs to retrain the ML model in an iterative manner, as aforementioned.

Modules for implementing the processes associated with (i) to (vii) above are shown in FIGS. 8B to 8E.

Referring to FIG. 8B, there is shown an overview of a device connectivity overlay engine. Server logs, SDK logs, bid streams, and so forth are denoted by data 2000. The data 2000 is provided to a data ingester 2010. Processed output data from the data ingester 2010 is provided to a connectivity generator 2020 that generates in operation a connectivity overlay 2030; the connectivity overlay 2030 includes in sequence an intra-device graph 2040, an inter-device graph 2050, an identity graph 2060, and a household graph 2070. It will be appreciated from analyzing these graphs 2040, 2050, 2060, 2070 that device pairing can be identified to a high degree of certainty. Output from the connectivity overlay 2030 is fed back, in operation, to the connectivity generator 2020 in an iterative manner to provide pairing result of greater certainty, namely representative reliability.

Referring next to FIG. 8C, there is shown an overview of data ingestion that occurs in operation in the data ingester 2010. From a given data source, for example denoted by a data source X 2100, activity history data is provided to an ETL module 2110 that provides corresponding processed data to botnoise filter 2120 that provides in operation filtered data to a normalization and sampling module 2130. Output from the normalization and sampling module 2130 is then provided to an event store X 2140 whose entries are used as input data to rules that are applied in the system 200 to identify association between pairs of user devices.

Referring next to FIG. 8D, there is shown a process of data election that is performed for generating an event data set for use in determining pairing of user devices. A data store X 2200 provides data to an event access control system 2210 that applies various policy rules, for example a policy I 2220, to generate an event set I 2230, that is employed when determining pairings that are indicative of associations between devices; "I" is an integer. The policy rules are employed to determine which categories of data are employed for finding associations between devices, for example:
  (i) by owner x, y, z;
  (ii) by country A (iii): and
  (iii) by time between Oct. 20, 2017 and Nov. 20, 2017.

It will be appreciated that other types of categories are optionally employed, in substitution or addition, in operation of the system 200, when determining pairing of devices.

Referring next to FIG. 8E, there is shown modules and processes employed for performing intra-device graph construction. An event set I 2300, for example derived from the event set I 2230, provides event data to a feature vector generator (FVG) 2310 whose output data enables a candidate pair generator 2320 to identify potential pairing of devices. Output pair data from the candidate pair generator 2320 is provided to a decision module 2330 that is operable to perform deterministic pairing, using a subset of feature vectors, to provide low confidence (denoted by "Z1") and high confidence (denoted by "Z2") data results.

The low confidence results (Z1) are provided in operation to an ML scoring module 2340, that using a subset of feature vectors. In an event that the ML scoring module 2340 generates low confidence data results, these results are employed to indicate likely inter-device candidate pairs 2380. As a function of results from the ML scoring module 2340 and the high confidence data results (Z2), likely intra-device pairs 2350 are generated, that are provided to a clustering module 2360 for generating, for example, intra-device graph type 1 (new fragments) 2370; however, other types of graphs can be thereby generated, for example as illustrated in FIG. 8B.

FIG. 9 is an illustrative process flow diagram 800 representing details of configuration of the scoring engine 204 to implement the training module 706 of FIG. 8A in accordance with some embodiments of the present disclosure; a generally similar approach is adopted in respect of FIGS. 8B to 8E. The training module 706 implements both a semi-supervised learning and a supervised learning process. An unsupervised pre-training module 802 performs pre-training based upon feature vectors of labeled and unlabeled device pairs; if labels are involved, supervised learning is beneficially employed, where, if labelled and unlabeled data are missed together, there is employed semi-supervised learning.

In accordance with some embodiments, the unsupervised pre-training module 802 produces the mapping that a remapping module 804 will use to remap features in feature vectors of labeled device pairs to the device remap pair clusters determined by the pre-training module 802. The remapping module 804 maps candidate device pair feature vectors to remap clusters that are stored in a computer readable storage device and that are used to facilitate supervised learning. The remapping module 804 maps candidate device pair feature vectors to remap clusters so as to cluster together device pairs having greater feature vector similarity as determined using the unsupervised pre-training process. A supervised training module 808 determines scores to associate with device pair feature vectors based upon features of labeled device pairs. The determined scores are indicative of likelihood that both devices of pair are associated with the same user. The device pair remap clustering performed using the remapping module 804 facilitates supervised learning by improved targeting of labeled feature vectors to feature vector remap clusters with which they have the greatest affinity. More specifically, the unsupervised pre-training module 802 and the remapping module 804 act to map feature vectors that correspond to candidate device pairs to remap clusters so as to cluster candidate device pairs based upon their representation in feature space. As explained above, labeled device pairs have a label value of −1 or +1 and unlabeled device pairs have label value 0. It will be appreciated that in accordance with some embodiments of the present disclosure, the unsupervised pre-training restructures the feature vector data to reduce dimensions with very sparse data.

A supervised training module 808 determines precision pair scores to associate with candidate device pair feature vectors based upon features of labeled device pairs. The determined scores are indicative of likelihood that both devices of a candidate device pairs are associated with the same user. The device pair remap clustering performed using the module 804 facilitates supervised learning by improved targeting of labeled feature vectors to feature vector remap clusters with which they have the greatest affinity.

FIG. 10A is an illustrative drawing representing an example in which the unsupervised pre-training module 804 remaps the device pairs of FIG. 7B to device pair remap clusters based upon the candidate device pair feature vectors in accordance with some embodiments of the present disclosure. Each candidate device pair remap cluster is associated with a set of feature vectors that is distinct from a set of feature vectors of other device pair remap clusters, as determined using an unsupervised training process. This intermediate-mapping to device pair remap clusters is commonly known as a "feature-space embedding" and the process of using the unlabeled examples is often termed the "unsupervised pre-training" step of a semi-supervised learning process.

In some embodiments of the present disclosure, the unsupervised pre-training module 802 uses Bayes Networks in operation to train the remapping module 804 to produce the device pair remap clusters. In alternative embodiments of the present disclosure, the unsupervised pre-training process can use PCA, Tree-Embedding, Auto-encoders or RBMs, for example. More particularly, in accordance with some embodiments of the present disclosure, the supervised learning process produces a remapped training data set 806. In FIG. 10B, there is shown an illustrative drawing representing use of the remapping module 804 in remapping of an example feature vector V in an original feature space spanned by $\{x.sub.1, x.sub.2, \ldots, x.sub.n\}$ according to a generic nonlinear embedding function E into a latent space spanned by $\{I.sub.1, I.sub.2, \ldots, I.sub.k\}$, where k is not necessarily >n or <n. The latent space representation E(V) allows more efficient learning.

The supervised learning module 808 infers correlation functions from labeled training data, which can be used to estimate likelihood of unlabeled device pairs belonging to same users. In some embodiments of the present disclosure, the supervised learning process uses Bayesian Network or Tree Ensembles to produce the device pair scores and to produce the scoring model. In alternative embodiments of the present disclosure, the supervised learning process can use Regression Models, or Neural Networks. A goal of this process is to minimize residual between model estimation of likely device pairs and labeled data. The supervised learning module 808 produces a mathematical scoring model, which consists of model parameters in a feature space that is defined in the remapping module 804. The scoring model is used to configure the scoring module 708 described above to score all other candidate device pairs.

Next, data transformations performed during scoring will be described in greater detail. Referring to FIG. 11, there is shown an illustrative diagram representing a data flow process 1000 including data transformations that occur within computer readable storage devices within the scoring engine 204 in accordance within some embodiments of the present disclosure. In operation, the scoring engine 204 receives candidate device pairs data structures 1002 as input from the pairing engine 202. It will be appreciated that, during the training stage, candidate device pairs are used to train the scoring engine 204. The candidate device pair data structures include deviceIDs identifying each device of a device pair and include corresponding preliminary pair scores for the paired devices. In a first data transformation, feature vectors are associated with the candidate device pairs resulting in data structures that associated candidate device pairs, their preliminary pair scores and their associated feature vectors 1004. In some embodiments of the present disclosure, the preliminary pair scores are incorporated within the feature vectors. In a second data transformation, training label data 1005 are associated with the candidate device pairs resulting in candidate device pairs, their preliminary pair scores, their associated feature vectors and their associated training labels 1006. It will be appreciated here that labeled feature pairs have a label value of −1 or +1 and that unlabeled device pairs have a label value of 0. In a third data transformation, unsupervised pre-training involving modules 802 and 804 uses device pair feature vectors and their associated training labels to produce affinity scores of candidate device pair clusters (A, B, C, D) 1008 in which clusters are created, which then appended to feature vectors. In a fourth data transformation, supervised training involving the supervised training module 808 to produce precision pair scores to associate with the candidate device pairs 1010 and to determine parameters used for the scoring model.

Test label data 1012 is used by the testing module 709 to perform a precision evaluation of the scores assigned to the device pairs 1008 during the fourth data transformation. The test label data 1012 used during precision evaluation is disjoint from the training label data 1005. In other words, the labeled device pairs, used as the test label data 1012, are disjoint from the labeled device pairs used for the training label data 1002. Device pairs are put into different quantized pair score buckets. In a fifth data transformation, by measuring precision and recall in each score bucket, there are transformed device pair model scores to precision scores. Device pairs in precision pair score that bucket below a quality threshold are filtered out. Final device pairs 1014 having invalidated pair scores are removed from the corpus of training results used to configure the feature based scoring module 708 of FIG. 8A. By way of example, the device pair $D_{i1}$-$D_{j1}$ is shown to be removed by the precision filter.

Next, the clustering engine will be described in greater detail. In FIG. 12, there is shown an illustrative process flow diagram 1100 representing a configuration of the clustering engine 206 in accordance with some embodiments of the present disclosure. Modules of the diagram correspond to computer program code (not shown) that configures a computer system, for example a data processing system, that includes one or more processors and/or control components to cause performance of the specific acts represented by the different modules. A module 1102 receives candidate device pairs and associated precision pair scores from the scoring engine 204. It will be appreciated that some of the first candidate pairs identified using the pairing engine 202 may be filtered out by the scoring engine 204 such that a different second set of candidate device pairs may be received by the clustering engine 206. A module 1104 assembles a graph that incorporates the received device pairs. In some embodiments of the present disclosure, a module 1104 configures a computer system to act as a graph generator. FIG. 13 is an illustrative drawing representing an example graph produced using the cluster engine of FIG. 12 for the candidate device pairs of FIGS. 4A to 4B in accordance with some embodiments of the present disclosure. It will be appreciated that the graph uses precision pair scores produced using the scoring module 708 of the scoring engine 206 rather than the preliminary pair scores produced using the pairing engine 202. Graph nodes correspond to device identifiers. Graph edges that connect graph nodes indicate device pairs. Precision pair scores associated with the graph edges indicate the likelihood that the associated devices of the device pairs actually are associated with the same user.

In the course of generating a graph, the module 1104 prunes some graph edges from the device graph. More particularly, in accordance with some embodiments, the module 1104 implements a local graph sparsification process to clean the graph before graph clustering is performed. Inputs to the local graph sparsification process include device pairs (sets of two device IDs) with associated precision pair scores provided using the scoring module 708. Outputs from the graph sparsification process include fewer pairs, judiciously chosen. One simple way of choosing pairs to remove before doing clustering is to impose a flat cut on the score. For example, all pairs with precision scores <0.1, for example, would be thrown away. Although the flat cut method is simple it sometimes is not optimal since it tends to be overly harsh on less dense portions of the graph than it is on over-dense portions of the graph, destroying our ability to keep many good clusters. Alternatively, local graph sparsification improves upon the flat cut approach. A judiciously pruned graph provides a better indication of relationships between device pairs. Specifically, for example, devices associated with different device pairs that share a deviceID in common also share a node in common in the graph. Moreover, the edge scores indicate the relative strengths of different device pairs.

The module 1106 selects potential user device clusters within the graph for evaluation as to whether they actually include one or more user device clusters. FIG. 14 is an illustrative drawing representing a set of example proposed user device clusters user device clusters $U1_A$-$U9_A$ identified using the graph of FIG. 13 in accordance with some embodiments. It will be appreciated that a number of graph edges have been removed to produce the proposed user device clusters. For example, the graph edge between device D4 and Cookie C2, which is shown in FIG. 13, is absent from FIG. 14.

The module 1108 modifies the proposed user device cluster to attempt to identify a valid user device cluster based upon one or more cluster fitness requirements. The user device cluster modification may involve adding, deleting or combining edges within the potential device cluster to attempt to meet the cluster fitness requirements. A decision module 1110 determines whether or not the fitness requirements have been achieved through the modifications by the module 1108. In response to a determination by decision the module 1110 that the fitness requirement has not yet been achieved, a decision module 1112 determines whether to continue to modify the potential cluster to meet the fitness requirements. In response to the decision module 1112 determining to continue to modify, control flows back to the module 1108. In response to decision module 1112 determining to not continue to modify, a module 1114 abandons the proposed cluster.

In response to the decision module 1110 determining that the cluster fitness requirements have been achieved, a cluster accuracy filter module 1115 determines which device identifiers of a proposed user device cluster are to be associated with a final user device cluster and which devices of the user proposed device cluster are to be removed. A module 1116 outputs the cluster as a final cluster. Following the module 1114 or following the module 1116, depending upon control flow for a given potential user device cluster, control flows to a decision module 1118, which determines whether or not there are more potential device clusters in the graph to be evaluated. In response to a determination that that are more potential device clusters in the graph to be evaluated, control flows to back to the module 1106 and another potential user device cluster is identified. In response to a determination that there are no additional device clusters to be evaluated, control flows to the module 1120, which causes decision module to wait for new potential device clusters.

FIG. 15 is an illustrative drawing representing an example set of final device clusters $U1_B$-$U9_B$ produced using the cluster engine of FIG. 12 based upon the proposed user device clusters of FIG. 14 in accordance with some embodiments. One or more of the final device clusters of FIG. 14 are modified relative to the proposed user device clusters to remove device indicators as determined by the second model training process. In particular, for example, device identifiers for cookie C13 was present in proposed user device cluster $U5_A$ but is missing from user device cluster $U5_B$. The final device clusters $U1_B$-$U9_B$ can act as digital identity group communication systems for communication with users who own, or are associated with, devices identified within the clusters. In other words, the clusters act as digital identity group communication systems for use to identify multiple devices that can be used to communicate with associated users.

Next, a cluster fitness determination with label propagation will be described in greater detail. In accordance with some embodiments of the present disclosure, the modules 1108 to 1116 perform user device clustering via label propagation to arrive final user device clusters that include sets of nodes assigned to unique user identifiers. Label propagation in accordance with some embodiments of the present disclosure, involves initially assigning each vertex in the pairing graph a unique label, and then propagating the label to other vertices through the connected edges, and updating the labels associated with each vertex in the graph. Label propagation and label updating are performed iteratively, until it can no longer update the label for every single node in the graph (a node will not update its label if no incoming label has a better aggregated score than the current label's score). Once label propagation stops, whatever the nodes/vertices that have the same label will be treated as belonging to the same user.

To propagate the label, in accordance with some embodiments, each node of the graph sends its label to its neighboring (UK English: "neighbouring") nodes, and it will also receive the label sent over from its neighbor (UK English: "neighbour") nodes at the same time. In addition to sending and receiving labels, each vertex also updates its label based on its current label and all the labels that it receives from its neighbor. The whole process is carried out at each individual node and in parallel. Within each node, there are three parameters that control the behavior (UK English: "behaviour") of sending the label to other nodes. First is a percentage number that controls what fraction of neighbor nodes will receive the label from current node, second is an integer number that limits the maximum number of nodes that will receive the label from current node and the third is an integer number that controls how far a label can travel through the graph.

The details regarding the percentage parameters that controls the fraction of neighbor nodes to receive label are the following: Each node first computes maximum value of the pair scores associated with all the edges that connect the node to its neighbors, it then sends out label only to those neighbors whose scores are above this percentage of the maximum value.

Regarding the second parameter, even if there are a lot of neighbors that are qualified to receive the label from current node, this parameter is used to restrict it to top few nodes. We will sort all the qualifying edges in descending order and propagate labels only through the top edges determined by this parameter.

The third parameter controls how far a label can traverse throughout the graph. In operation, there is tracked how many edges a label has traveled so far, and there is not allowed a label to travel any further once the number of edges it traveled exceeds this integer limit.

As a given label travels through the graph, it collects pair scores along the path it travels. Each label starts with an initial score of 1. For a label that originates from one node (for example a node A) to another node (for example a node B), the score of that label is defined as the score of the label at the node A, multiplied by the score of the edge that connects the nodes A and B and divided by the number of edges the label has traveled to reach this node. Each node will aggregate the score for all the labels that it receives, will pick the label with maximum score and assign that label to itself if the new score is greater than the score of the current label. The score of the new label will also be retained for a next iteration. If the label changes, the current node will propagate it to its neighbors for them to consume in the next iteration.

It will be appreciated that the final output of the label propagation module depends on the joint behavior of all the above parameters. While it is difficult to predict which combination of those parameters will provide the best performance, there is actually defined a user clustering performance metrics (for example, precision of the user clusters), allocated a separate set of the pairing input as training data and implemented a grid search to find the combination of all the parameters that yields the best performance on the output user clusters. There is then applied the optimal value of those parameters to the future pairing input and generate optimal user clusters.

Next, cluster fitness determination with simulated annealing will next be described in greater detail. Alternatively, in accordance with some embodiments, the modules 1108 to 1116 perform user device clustering via label simulated annealing. Simulated annealing is an iterative, probabilistic, cluster fitness-driven algorithm annealing is performed once per node (device) in the graph as each node acts as a "seed" for an eventual user device cluster. The cluster fitness function is maximized when both:

(i) the members of the cluster are strongly interconnected, meaning most of the possible pairs between the member nodes are observed to exist and they have very high scores; and (ii) the cluster is very weakly connected to devices outside of the members of the cluster.

The simulated annealing process proposes to add or subtract edges (pairs) between devices at random and accepts these proposals with a probability related to the fitness of the resulting cluster. The simulated annealing process iterates and the acceptance probabilities evolve according to a simulated temperature schedule (starting in the more randomized "high-temperature" phase evolving into the more optimization-focused "Low-Temperature" phase). The process stops when temperature is below some value and the value of the cluster fitness function has stabilized.

Simulated Annealing is an example of the class of "Fitness-Driven" Clustering methods. "Fitness-Driven" methods are one of the triad taxonomy of clustering algorithms as "divisive", "agglomerative" or "fitness-driven", where of course hybrids can be formed by combining examples of any of these. The process and end-result of annealing requires the specification of the cluster fitness function wherein, contrary to intuition from popular examples, there is much freedom to customize the algorithm. As aforementioned, a typically-used cluster fitness function is a product of two factors that is maximized when:

(i) the devices within the found clusters are maximally inter-connected; and (ii) the devices within a given cluster are maximally isolated from those outside the given cluster.

Given this definition of cluster fitness, there are nearly zero free-parameters in the annealing algorithm (namely, what is left is the temperature schedule), so it would appear that there is nothing to tune and the clusters you get from applying annealing are "The annealing clusters".

However, in specific problem domains it is very often beneficial to add, by hand, additional terms to the cluster fitness function to penalize or encourage various effects/metrics that are seen in the end clusters. Since these terms are added by hand, it is not known what their individual strengths should be compared to each other, or to the original baseline fitness described above, in order to obtain an optimal clustering. There is therefore typically introduced one such free-parameter that needs to be tuned for each additional term in the fitness function.

For example, in the example graphs described above, there can be several distinct "types" of candidate device pairs (for example, desktop-cookie to desktop-cookie, or mobile-device to mobile device, or mobile-web-cookie to mobile device, and so forth), each with its own pair scoring model. Between pair types, the performance as a function of score is quite different, owing to the many differences in systematic effects that go into collecting data regarding the various "devices" (namely, differing rates of activity on laptops vs. smartphones for example). Thus, it is appropriate to add additional factors to the cluster fitness function to account for these differences (for instance, to trust clusters built on a good mix of cookie-device pairs more than those built primarily on cookie-cookie pairs if your cookie-device model is the more performant of the two). In this case the full fitness function can be written as:

$$\text{Fitness}(C) = \sum_a \lambda_a \left[ \binom{C_{in}^a}{2}^{-1} \sum_i^{C_{in}^a} s_i \right] \cdot \left[ \frac{\sum_i^{C_{in}^a} s_i}{\sum_i^{C_{in}^a} s_i + \sum_j^{C_{ex}^a} s_j} \right]$$

wherein the sum over 'a' is a sum over pair types (cookie-device, cookie-cookie, and so forth) the various C's denote the number of internal or external pairs of type "a", and the lambdas are the free parameters that we need to tune to find optimal performance.

Tuning these parameters is done as separate step, namely by optimizing a combination of cluster precision (using labeled data) and by using a heuristic metrics using a subgraph of the entire device graph. In practice, the cluster precision is the dominant factor in a choice of optimal parameters that is employed, but it is optionally feasible to supplement this with simple metrics like average cluster fitness, average number of devices/cluster, and so forth. Finding the optimal parameters given a desired quantity to be optimized is, in practice, a routine optimization problem. Some of the simplest techniques to solve this include grid search and Monte Carlo approaches (wherein a searching region is defined by boundary conditions that limit a size of the searching region). For fitness functions with much more than four free parameters, the computation typically is prohibitively expensive and it is generally necessary to do something more "intelligent" to find a good optimum (for example Markov chain, Monte Carlo or Bayesian variants thereof).

The partitioning of data in this optimization phase is analogous to that of basic supervised learning: there is selected a random sub-graph of the entire graph to be given "testing" data set and another to be a given "training set", whereby there is optimized metrics using the clusters in the training set and there is then verified this performance on the testing set before proceeding to apply the optimal clustering to the entire device graph.

Next, data transformations employed during device clustering will be described in greater detail. In FIG. 16, there is provided an illustrative diagram representing a data flow process 1500 including data transformations that occur during user device clustering within the cluster engine 206 in some embodiments of the present disclosure. The clustering engine 206 is operable to receive as input from the scoring engine 204, candidate device pairs associated with feature vectors and precision pair scores 1502. In a first data transformation, a graph 1504 is created in which user devices are represented by graph nodes, device pairs are represented by graph edges and device pair scores are associated with corresponding graph edges. In a second data transformation, graph modification is performed to produce proposed user device clusters 1506. The example proposed user device clusters of FIG. 14 are shown. In a third data transformation, test label data 1510 is used to determine whether device pairs within user the proposed user device clusters meet a second threshold level of precision. Final user device clusters 1512 are produced in which user device pairs have removed if they do not meet the second precision threshold level. The final device clusters 1512 of FIG. 15 are shown in which, for example, cluster U.sub.5B is removed from the final set of clusters.

Next, there will be described finding a balance between pairing and clustering. The approach of pairing candidate devices using the pairing engine 202 and in the score engine 204 is designed to produce pair scores that come as close as possible to "Oracle Precision", meaning all pairs whose devices are truly owned by the same person have score=1 and all of those that do not have score=0. In reality, of course, the scoring model is not perfect, and scores for the vast majority of pairs lie between these extremes. Part of this imperfection is irreducible (pure stochastic noise that cannot be predicted, typically termed "variance"), but much of imperfection is reducible (typically termed "bias").

There are many other useful pieces of information that are not included in the pairing engine. In principle, it is feasible to featurize any of this information and input it directly to the pairing engine to improve predictions provided in operation by the system 200. Much of this information has to do with information about devices that are not included in the pair (say A-B) itself, questions like:
  (i) How many of A's friends are also B's friends?
  (ii) How many of A's friends have been seen on the same IP as B?
  (iii) How many friends do A and B have, respectively?
  (iv) How many of A's good friends are also friends of B?

Some of this information has actually been fed into the pairing engine already (hitherto referred to as "device graph feedback to pairing" or "satellite features"), and so forth.

It will be appreciated that a more efficient way of appreciating this information is apparent: there is sought to give the pairing engine a view of the local properties of the device graph that can be built around this pair. From the device graph point of view all of these questions can be answered at once, and with relative ease, whereas the amount of work necessary to provide a comprehensive encoding of the information in the device graph as features to the Pairing Engine is prohibitive. Thus, as a matter of efficiency and practicality, there is "drawn a line", figuratively speaking, as to how much information there is added to the pairing engine 202 and/or to the score engine 204 to generate good pair scores and how much will only be taken into account in the clustering engine 206 after constructing the device graph.

Taking this modular structure "Pairing Engine=>Clustering Engine", rather than trying to make one big model that goes beyond convenience, actually improves the end result. The fact is that, while the pairing candidate devices using the pairing engine 202 and/or the scoring engine 204 has the theoretical capability to entirely eliminate the reducible error (bias) in our predictions, the amount of work necessary to improve the performance of the pairing engine 202 and/or the scoring engine 204 typically grows exponentially with the desired improvement or enhancement in performance. Stopping short and sending the pair scores of an approximate pairing model on to the separate clustering engine 206 allows to recoup the majority of the possible bias reduction with much less computational effort.

Next, the system 200 will be described in respect of its network environment. In FIG. 17, there is provided an illustrative drawing representing the system 200 of FIG. 2 configured to operate in a network environment accordance with some embodiments of the present disclosure. The system 200 in a network environment 1600 includes a first server system 1602 to receive mobile application usage information and page view information from users. The first server system 1602 includes a targeting engine 1606 to target information delivery to a user across multiple devices and to provide a user-based frequency-cap for information delivered to a user across multiple devices, an insight engine 1608 to provide cross-device attribution across multiple devices of a user, and to provide offline-online attribution to user, an optimization engine 1610 to produce user-based optimization and platform-based optimization.

The system 200 includes a second server system 1604 to produce user device cluster indicating groups of devices associated with users. The second server system 1604 includes the pairing engine 202, the scoring engine 204, the cluster engine 206 the FVG engine 212, the raw or preprocessed data 209 and the rules storage 213. In accordance with some embodiments of the present disclosure, the second server is configured to act as a distributed massively parallel processing and distributed storage system in accordance with a Hadoop framework. Thus, in effect, a multiplicity of instances (as shown) of the pairing engine 202, scoring engine 204 and cluster engine 206 engines run in parallel.

The system 1600 includes a first interface (indicated within dashed lines) 1612 between the first server 1602 and Hadoop cluster 1604. The first interface 1612 includes a third server 1614 that collects a log containing information from the first server 1602 relating to users' interaction with devices such as mobile application usage and page views. The log optionally includes an append-only, ordered sequence of records, ordered by time. Typically, each entry is assigned a unique sequential log entry number. Since log entries are time-ordered, a log entry number can act as a "timestamp" of the entry. The third server 1614 is configured to handle high-throughput, low-latency real-time data feeds. In accordance with some embodiments, the third server 1614 is configured to act as a message broker that mediates communications between different applications, such as a pushing bidding model to the server 1602 and pushing log files from the server 1610 to the Hadoop cluster 1604. In accordance with some embodiments of the present disclosure, the third server 1614 is implemented according to a log collection system documentation, although other types of system documentation can alternatively be employed. The first interface 1612 also includes a log extractor module 1616 within the second server 1604 that extracts logs from the third server 1614 and provides the logs to the pairing engine 202. The log extractor 1616 acts as a data normalizer that converts unstructured data received within the third server 1614 to structured data such as key value pairs, for example, suitable for input to the pairing engine 202. It will appreciated that information within the log may be received from different user device platforms that structure data differently.

The system 1600 includes a second interface (indicated within dashed lines) 1618 between the first server 1602 and the second server 1604. The second interface 1618 includes a user profile module 1620 within the second server 1604 that receives and stores user device cluster information produced by the cluster engine 206 that indicates groups of devices associated with users. As explained above, the cluster engine 206 produces user device clusters structures that associate clusters of user device IDs with unique users. The user profile module 1620 stores information that associates user deviceID clusters with unique users. In some embodiments of the present disclosure, the user profile module 1620 also receives information from the log extraction module 1616, such as user demographic information including one or more of gender, age, income, location and behavioral patterns (for example, search patterns), for example. The second interface 1618 also includes a fourth server 1622 that obtains the user device cluster structures from the user profile module 1620 and provides it to the first server. The fourth server 1622 is configured to serve many concurrent users. In accordance with some embodiments of the present disclosure, the fourth server 1622 is configured to store, retrieve, and manage document-oriented information, sometimes referred to as semi-structured data. Document oriented databases are a category of NoSQL databases, which are designed around an abstract notion of a "Document". In accordance with some embodiments, the fourth server 1622 is implemented using storage data servers, which can be clustered from a single machine to very large scale deployments spanning many machines, and that are configured to provide scalable key-value or document access with low latency and high sustained throughput.

The system 1600 includes a third interface (indicated within dashed lines) 1624 between the first server and the second server. The third interface 1624 includes a campaign delivery and performance module 1626 within the second server 1604 that receives and stores the count of user device cluster structures that indicate groups of devices associated with users. In some embodiments of the present disclosure, the campaign delivery and performance module 1626 also receives information from the log extraction module 1616 such as, the number of ad impressions (namely, "advertisement impressions") on a user's desktop devices, number of impressions received on a user's mobile device and number of impressions received on multiple devices of a user, for example. In accordance with some embodiments of the present disclosure, the campaign delivery and performance module is configured according to the Hive data warehouse infrastructure, which is based upon Hadoop. A Hive infrastructure is best suited for batch jobs over large sets of data such as ad campaign data, for example. The third interface 1624 also includes a fifth server 1628 that extracts campaign performance information from the campaign delivery and performance module 1626 and provides it to the first server 1602. In accordance with some embodiments of the present disclosure, the fifth server 1628 includes a SQL server that provides access by the second server to information relating to user based campaign and performance reach.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

What is claimed is:
1. A system comprising:
a connectivity overlay engine comprising:
a data ingester configured to:

receive, from a data source, the raw or preprocessed data,
process, at an Extract Transform Load (ETL) module, the raw or preprocessed data received from the data source,
filter, at a botnoise filter, the processed data received from the ETL module,
normalize and sample, at a normalization and sampling module, the filtered data received from the botnoise filter to produce output data, and
transmit the output data to a data store;
a connectivity generator, configured to generate a connectivity overlay comprising, in sequence, an intra-device graph and an inter-device graph;
an event access control system, configured to:
receive data from the data store, and
generate an event set, wherein the event set is based on the data received from the data store and at least one first rule; and
a feature vector generation framework executable by one or more processors and configured for producing multiple feature value feature vectors corresponding to determined candidate device pairs, based at least in part upon device activity history associated, within the raw or preprocessed data, with devices of the determined candidate device pairs, wherein the feature vector generation framework is operable to employ at least one second rule to produce a feature value for at least one feature represented within a feature vector corresponding to at least one determined candidate device pair based at least in part upon both (a) the device activity history associated, within the raw or preprocessed data, with a first device identifier of the at least one determined candidate device pair, and (b) the device activity history associated, within the raw or preprocessed data, with a second device identifier of the at least one determined candidate device pair, and wherein the feature vector corresponding to the at least one determined candidate device pair comprises a first confidence result and a second confidence result, the first confidence result being used to generate the inter-device graph, and the second confidence result being used to generate the intra-device graph.

2. A system comprising:
a connectivity overlay engine comprising:
a data ingester configured to:
receive, from a data source, the raw or preprocessed data,
process, at an Extract Transform Load (ETL) module, the raw or preprocessed data received from the data source,
filter, at a botnoise filter, the processed data received from the ETL module,
normalize and sample, at a normalization and sampling module, the filtered data received from the botnoise filter to produce output data, and
transmit the output data to a data store;
a connectivity generator, configured to generate a connectivity overlay;
an event access control system, configured to:
receive data from the data store, and
generate an event set, wherein the event set is based on the data received from the data store and at least one first rule; and
a feature vector generation framework executable by one or more processors and configured for producing multiple feature value feature vectors corresponding to determined candidate device pairs, based at least in part upon device activity history associated, within the raw or preprocessed data, with devices of the determined candidate device pairs, wherein the feature vector generation framework is operable to employ at least one second rule to produce a feature value for at least one feature represented within a feature vector corresponding to at least one determined candidate device pair based at least in part upon both (a) the device activity history associated, within the raw or preprocessed data, with a first device identifier of the at least one determined candidate device pair, and (b) the device activity history associated, within the raw or preprocessed data, with a second device identifier of the at least one determined candidate device pair.

3. The system of claim 2, wherein the feature vector corresponding to the at least one determined candidate device pair comprises a first confidence result and a second confidence result, the first confidence result being used to generate an inter-device graph, and the second confidence result being used to generate an intra-device graph, wherein the first confidence result is associated with an inter-device candidate pair and the second confidence result is associated with an intra-device candidate pair.

4. The system of claim 2, further comprising a data structure for storing information identifying groups of device identifiers associated with different respective users, wherein the groups of the device identifiers are used to target information over the Internet to the different respective users associated with the groups of the device identifiers.

5. The system of claim 2, wherein the raw or preprocessed data are used to associate device identifiers with one or more network source or destination address identifiers.

6. The system of claim 5, further comprising a pairing framework, wherein the pairing framework is operable to identify device pairs based at least in part upon the device identifiers and the one or more network source or destination address identifiers.

7. The system of claim 2, wherein the feature vector generation framework is operable to determine feature values to associate with respective determined candidate device pairs based at least in part upon device activity history associated, within the raw or preprocessed data, with device identifiers of second devices of the respective determined candidate device pairs.

8. The system of claim 2, further comprising a scoring engine to determine scores to associate with the determined candidate device pairs, based at least in part upon the produced multiple feature value feature vectors associated with the determined candidate device pairs.

9. The system of claim 2, further comprising a graph structure storing one or more of an inter-device graph and an intra-device graph, wherein nodes within the graph structure represent device identifiers, including the first device identifier and the second device identifier of the at least one determined candidate device pair.

10. The system of claim 9, further comprising a clustering engine operable to identify clusters of nodes within the graph structure based at least in part upon one or more cluster fitness requirements.

11. A method comprising:
providing a connectivity overlay engine;
using a data ingester, executable by one or more processors, to:
receive, from a data source, raw or preprocessed data, process, at an Extract Transform Load (ETL) module, the raw or preprocessed data received from the data source, filter, at a botnoise filter, the processed data received from the ETL module, normalize and sample, at a normalization and sampling module, the filtered data received from the botnoise filter to produce output data, and transmit the output data to a data store;

using a connectivity generator, executable by the one or more processors, to generate a connectivity overlay;

using an event access control system, executable by the one or more processors, to:

receive data from the data store, and generate an event set, wherein the event set is based on the data received from the data store and at least one first rule; and using a feature vector generation framework, executable by the one or more processors, for producing multiple feature value feature vectors corresponding to determined candidate device pairs, based at least in part upon device activity history associated, within the raw or preprocessed data, with devices of the determined candidate device pairs, wherein the feature vector generation framework is operable to employ at least one second rule to produce a feature value for at least one feature represented within a feature vector corresponding to at least one determined candidate device pair based at least in part upon both (a) the device activity history associated, within the raw or preprocessed data, with a first device identifier of the at least one determined candidate device pair, and (b) the device activity history associated, within the raw or preprocessed data, with a second device identifier of the at least one determined candidate device pair.

12. The method of claim 11, wherein the feature vector corresponding to the at least one determined candidate device pair comprises a first confidence result and a second confidence result, the first confidence result being used to generate an inter-device graph, and the second confidence result being used to generate an intra-device graph, wherein the first confidence result is associated with an inter-device candidate pair and the second confidence result is associated with an intra-device candidate pair.

13. The method of claim 11, further comprising storing information structures identifying groups of device identifiers associated with different respective users.

14. The method of claim 13, further comprising using the groups of device identifiers to target information over the Internet to the different respective users associated with the groups of device identifiers.

15. The method of claim 11, wherein the raw or preprocessed data are used to associate device identifiers with one or more network source or destination address identifiers.

16. The method of claim 11, wherein the feature vector generation framework is operable to determine feature values to associate with respective determined candidate device pairs based at least in part upon device activity history associated, within the raw or preprocessed data, with device identifiers of second devices of the respective determined candidate device pairs.

17. The method of claim 11, further comprising determining categories of data for finding association between second devices, and wherein the categories of data comprises at least one of an owner of the data, a location of the data, and a time period associated with the data.

18. The method of claim 11, further comprising a scoring engine to determine scores to associate with the determined candidate device pairs, based at least in part upon the produced multiple feature value feature vectors associated with the determined candidate device pairs.

19. The method of claim 11, further comprising storing a graph structure including one or more of an inter-device graph and an intra-device graph, wherein nodes within the graph structure represent device identifiers, including the first device identifier and the second device identifier of the at least one determined candidate device pair.

20. The method of claim 19, further comprising a clustering engine operable to identify clusters of nodes within the graph structure based at least in part upon one or more cluster fitness requirements.

* * * * *